US012682911B2

(12) United States Patent
Yeh et al.

(10) Patent No.: US 12,682,911 B2
(45) Date of Patent: Jul. 14, 2026

(54) AUTOMATIC DETECTION AND ATTENUATION OF SPEECH-ARTICULATION NOISE EVENTS

(71) Applicant: DOLBY INTERNATIONAL AB, Dublin (IE)

(72) Inventors: Chunghsin Yeh, Barcelona (ES); Giulio Cengarle, Barcelona (ES); Mark David De Burgh, Mount Colah (AU)

(73) Assignee: DOLBY INTERNATIONAL AB, Dublin (IE)

( * ) Notice: Subject to any disclaimer, the term of this patent is extended or adjusted under 35 U.S.C. 154(b) by 274 days.

(21) Appl. No.: 18/007,324

(22) PCT Filed: Aug. 11, 2021

(86) PCT No.: PCT/EP2021/072384

§ 371 (c)(1),
(2) Date: Jan. 30, 2023

(87) PCT Pub. No.: WO2022/034139

PCT Pub. Date: Feb. 17, 2022

(65) Prior Publication Data

US 2023/0267945 A1 Aug. 24, 2023

Related U.S. Application Data

(60) Provisional application No. 63/107,012, filed on Oct. 29, 2020.

(30) Foreign Application Priority Data

Aug. 12, 2020 (ES) ............................... ES202030864

(51) Int. Cl.
*G10L 21/0264* (2013.01)
*G10L 21/0232* (2013.01)
(Continued)

(52) U.S. Cl.
CPC ...... *G10L 21/0264* (2013.01); *G10L 21/0232* (2013.01); *G10L 21/0364* (2013.01);
(Continued)

(58) Field of Classification Search
CPC ............. G10L 21/0264; G10L 21/0232; G10L 21/0364; G10L 25/18; G10L 25/21; G10L 25/45; G10L 25/93
See application file for complete search history.

(56) References Cited

U.S. PATENT DOCUMENTS

| | | | |
|---|---|---|---|
| 4,718,096 | A | 1/1988 | Meisel |
| 5,572,623 | A | 11/1996 | Pastor |

(Continued)

FOREIGN PATENT DOCUMENTS

| | | | |
|---|---|---|---|
| CN | 101009099 | A | 8/2007 |
| CN | 101790122 | A | 5/2014 |

(Continued)

OTHER PUBLICATIONS

Mitra, Vikramjit, Bengt J. Borgstrom, Carol Y. Espy-Wilson, and Abeer Alwan, "A Noise-type and Level-dependent MPO-based Speech Enhancement Architecture with Variable Frame Analysis for Noise-robust Speech Recognition", Sep. 2009, Interspeech 2009, pp. 2751-2754. (Year: 2009).*

(Continued)

*Primary Examiner* — Daniel C Washburn
*Assistant Examiner* — James Boggs

(57) ABSTRACT

Described is a method of performing automatic audio enhancement on an input audio signal including at least one speech-articulation noise event. The method comprises: segmenting the input audio signal into a number of audio frames; obtaining at least one feature parameter from the audio frames; and determining, based at least in part on the obtained feature parameter, a respective type of the speech-
(Continued)

articulation noise event and a respective time-frequency range associated with the speech-articulation noise event within the input audio signal.

20 Claims, 12 Drawing Sheets

(51) Int. Cl.
*G10L 21/0364* (2013.01)
*G10L 25/18* (2013.01)
*G10L 25/21* (2013.01)
*G10L 25/45* (2013.01)
*G10L 25/93* (2013.01)

(52) U.S. Cl.
CPC .............. *G10L 25/18* (2013.01); *G10L 25/21* (2013.01); *G10L 25/45* (2013.01); *G10L 25/93* (2013.01)

(56) References Cited

U.S. PATENT DOCUMENTS

| | | | |
|---|---|---|---|
| 5,611,019 A | 3/1997 | Nakatoh | |
| 6,304,842 B1 | 10/2001 | Husain | |
| 7,089,180 B2 | 8/2006 | Heikkinen | |
| 7,369,990 B2 | 5/2008 | Nemer | |
| 7,680,653 B2 | 3/2010 | Yeldener | |
| 7,742,914 B2 | 6/2010 | Kosek | |
| 8,190,432 B2 * | 5/2012 | Matsumoto | G10L 21/0364 704/254 |
| 8,369,556 B2 | 2/2013 | Power | |
| 8,756,054 B2 | 6/2014 | Kovesi | |
| 8,775,184 B2 | 7/2014 | Deshmukh | |
| 9,208,794 B1 | 12/2015 | Mascaro | |
| 9,454,976 B2 | 9/2016 | Newman | |
| 10,170,126 B2 | 1/2019 | Kovesi | |
| 10,204,634 B2 | 2/2019 | Tada | |
| 10,242,696 B2 * | 3/2019 | Ebenezer | G10L 25/84 |
| 10,283,122 B2 | 5/2019 | Kjoerling | |
| 11,227,586 B2 * | 1/2022 | Borgstrom | G10L 15/20 |
| 11,771,372 B2 * | 10/2023 | Voix | A61B 5/6817 704/200 |
| 2007/0033042 A1 | 2/2007 | Marcheret | |
| 2008/0027717 A1 | 1/2008 | Rajendran | |
| 2010/0274554 A1 | 10/2010 | Orr | |
| 2010/0280823 A1 | 11/2010 | Shlomot | |
| 2012/0245927 A1 * | 9/2012 | Bondy | G10L 21/0232 704/203 |
| 2014/0324367 A1 | 10/2014 | Garvey, III | |
| 2016/0293175 A1 | 10/2016 | Atti | |
| 2017/0018277 A1 | 1/2017 | Wang | |
| 2017/0180853 A1 | 6/2017 | Mehta | |
| 2020/0258529 A1 | 8/2020 | Schnabel | |

FOREIGN PATENT DOCUMENTS

| | | | |
|---|---|---|---|
| CN | 110335620 | A | 10/2019 |
| CN | 111263284 | A | 10/2021 |
| CN | 108682418 | A | 3/2022 |
| EP | 3038106 | A1 | 10/2017 |
| JP | S61-077099 | | 4/1986 |
| JP | S62-067598 | | 3/1987 |
| JP | H4-130500 | | 5/1992 |
| JP | 2017112444 | A | 6/2017 |
| KR | 20000034465 | A | 6/2000 |
| WO | 1987003127 | A1 | 5/1987 |
| WO | 2019079909 | A1 | 5/2019 |
| WO | 2019232684 | A1 | 12/2019 |

OTHER PUBLICATIONS

Rao, K. Sreenivasa, and Anil Kumar Vuppala, “Speech Processing in Mobile Environments”, 2014, Springer International Publishing. (Year: 2014).*

Kong, Ying-Yee, Ala Mullangi, and Kostas Kokkinakis, “Classification of Fricative Consonants for Speech Enhancement in Hearing Devices”, Apr. 2014, PLoS ONE, vol. 9, No. 4, pp. 1-8. (Year: 2014).*

Talmon, Ronen, Israel Cohen, and Sharon Gannot, “Transient Noise Reduction Using Nonlocal Diffusion Filters”, Aug. 2011, IEEE Transactions on Audio, Speech, and Language Processing, vol. 19, No. 6, pp. 1584-1599. (Year: 2011).*

Cole, “Location and classification of plosive consonants using expert knowledge and neural net classifiers,” The Journal of the Acoustical Society of America 84, S60 (1988); doi: 10.1121/1.2026396, Jun. 10, 2005.

Haque et al., “Zero-Crossings with Adaptation for Automatic Speech Recognition,” Proceedings of the 11th Australasian International Conference on Speech Science and Technology, Jun. 28, 2005.

IZotope RX De-plosive, retrieved on Jun. 22, 2020, <https://www.izotope.com/en/products/rx/features/de-plosive.html>.

Keshet et al., “Plosive Spotting with Margin Classifiers,” Interspeech 2001.

Kondoz, “Digital Speech: Coding for Low Bit Rate Communication Systems,” Section 9.6 Speech Classification, pp. 311-319, 2nd edition, Wiley 2004.

Madsack et al., “Phone-Based Plosive Detection,” retrieved Jun. 22, 2020, <https://www.sfb732.uni-stuttgart.de/documents/files/plos_det_techreport.pdf>.

Vikhe, “Voice Activity Detection Algorithm for Speech Recognition Applications,” Conference Paper, Jan. 1, 2011.

Weigelt et al., “Plosive/Fricative Distinction: The Voiceless Case,” The Journal of The Acoustical Society of America, American Institute of Physics, 2 Huntington Quadrangle, Melville, NY 11747, vol. 87, No. 6, Jun. 1, 1990, pp. 2729-2737, XP000168512, ISSN: 0001-4966, DOI: 10.1121/1.399063.

Yanxiong et al., “A detection method of lip-smack in spontaneous speech,” Audio, Language and Image Processing, 2008, ICALIP 2008, International Conference on, IEEE, Piscataway, NJ, USA, Jul. 7, 2008, pp. 292-297, XP031298460, ISBN: 978-1-4244-1723-0.

“LS Levelator 2” Le Sound Levelator as accessed on Jan. 27, 2021, https://lesound.io/product/levelator/, pp. 1-7, 7 pages.

Asccusonus Mouth De-Clicker https://accusonus.com/products/audio-repair/era-bundle-standard#mouth-de-clicker-anchor as accessed on Jan. 24, 2021, 32 pages.

Charpentier et al., “Diphone synthesis using an overlap-add technique for speech waveforms concatenation,” In Int. Conf. Acoustics, Speech, and Signal Processing (ICASSP). vol. 11. IEEE, 1986, pp. 2015-2018, 4 pages.

De Leon, “Short-time kurtosis of speech signals with application to co-channel speech separation” Located via IEEE Xplore, Aug. 2002, pp. 831-833, 3 pages.

Esquef et al., “Interpolation of Long Gaps in Audio Signals Using the Warped Burg’s Method,” Proceedings of the 6th International Conference on Digital Audio Effects (DAFx-03), Lon don, UK, Sep. 2003, pp. DAFX-1-DAFX-6, 7 pages.

Fink et al., “Comparison of various predictors for audio extrapolation,” Proc. of the 16th Int. Conference on Digital Audio Effects (DAFx-13), Maynooth, Ireland, Sep. 2-6, 2013, pp. DAFX-1-DAFX-8, 8 pages.

Godsill et al., “Digital Audio Restoration—A Statistical Model Based Approach,” Springer, Sep. 21, 1988, pp. i-328, 346 pages.

Lukin et al., “Parametric Interpolation of Gaps in Audio Signals,” AES 125th Convention Oct. 2-5, 2008 San Francisco, CA, pp. 1-8, 8 pages.

Lukin, “The Making of RX Mouth De-Click,” 2017 https://www.izotope.com/en/learn/the-making-of-rx-6-mouth-de-click.html as accessed on Apr. 14, 2025, pp. 1-191, 191 pages.

Roebel et al., “Efficient spectral envelope estimation and its application to pitch shifting and envelope preservation,” International Conference on Digital Audio Effects 2005, Madrid, Spain, hal-01161334, pp. 30-35, 7 pages.

(56) References Cited

OTHER PUBLICATIONS

Roebel, "A new approach to transient processing in the phase vocoder," Proceedings of the 6th Int. Conference on Digital Audio Effects, DAFx-03, London, UK, Sep. 8-11, 2003, pp. DAFX-1-DAFX-6, 7 pages.

* cited by examiner

8100

8200

AUTOMATIC DETECTION AND ATTENUATION OF SPEECH-ARTICULATION NOISE EVENTS

CROSS-REFERENCE TO RELATED APPLICATIONS

This application is a U.S. National Stage application under U.S.C. 371 of International Application No. PCT/EP2021/072384, filed on 11 Aug. 2021, which claims priority of the following priority applications: ES application P202030864, filed 12 Aug. 2020 and U.S. provisional application 63/107,012, filed 29 Oct. 2020, each of which are hereby incorporated by reference.

TECHNICAL FIELD

The present disclosure is directed to the general area of performing automatic audio enhancement, such as automatic detection and attenuation, of speech-articulation noise events (e.g., mouth clicks, speech plosives, etc.).

BACKGROUND

On various media platforms, the increasing amount of speech content, often of diverse quality, has reached a point where relying solely on manual editing seems to be no longer feasible. Automatic speech enhancement, when done right, preserves speech naturalness and saves editing efforts.

Generally speaking, speech enhancement algorithms may deal with two types of unwanted "noise": noise produced by background sources and noise produced by articulation.

Plosive sounds belong to the second type. They generally occur when a burst of air is generated from the mouth (e.g., as during the pronunciation of syllables containing a "p" or "t") and causes large oscillations of the microphone's diaphragm on impact of the burst of air. In the context of the present disclosure, the term "plosive" is broadly used to include any burst of air from the mouth that causes large oscillations of the microphone's diaphragm (e.g., including short fricative sounds like "f", "z").

Even for speech content recorded in well-controlled acoustic environments, plosives may often produce a sudden low frequency boost, so-called "pop", resulting in unpleasant listening experience.

Several recording techniques have been proposed to reduce plosive strength, such as using a pop filter or a wind shield, speaking off-axis, etc. However, the "pop" reduction is not as effective as intended for practical reasons: for example, it may not be possible to fix the speakers' or actors' posture, or the physical filter would reduce emotional connection to an audience. Therefore, signal processing tools are necessary to improve the quality of such recordings. The process of detecting and attenuating plosives is often also be called "De-plosive" (or sometimes also referred to as "deplosive" or "deplosive processing").

Mouth clicks are another type of transient sounds caused by speech articulation using tongue/teeth/lips mixed with saliva. They may occur in speech parts as well as non-speech parts, often audible for high SNR recordings through headphones/earphones. Mouth clicks are short in general, often of a duration between 10-100 ms, and can also appear as several consecutive transients.

In the context of professional recordings such as TV/film/game dialogues, click-free speech quality could be very demanding. Nowadays, even for user-generated contents, the mouth clicks are becoming very audible because of the popularity of earphone/headphone listening.

Several recording techniques have been proposed to reduce mouth clicks for professional voice actors/actresses. However, in most situations there is no way to control the speaker's mouth/lip condition. For post-processing, manual editing may be tedious, rendering it impracticable for dealing with hundreds/thousands of dialogues. Therefore, signal processing tools are necessary to correct the mouth clicks more efficiently. The process of detecting and attenuating mouth clicks is often also called "Mouth De-click" or simply "De-click" (or sometimes also referred to as "declick" or "declick processing").

Thus, broadly speaking, the focus of the present disclosure is to propose techniques of performing automatic audio enhancement (including, but is not limited to detection and attenuation) of audio signals including one or more speech-articulation noise events (e.g., mouth clicks, speech plosives, etc.).

SUMMARY

In view of the above, the present disclosure generally provides methods of performing automatic audio enhancement on an input audio signal including at least one speech-articulation noise event, as well as a corresponding apparatus, program, and computer-readable storage media, having the features of the respective independent claims.

According to an aspect of the disclosure, a method of performing automatic audio enhancement on an input audio signal including at least one speech-articulation noise event is provided. As will be understood and appreciated by the skilled person, the automatic audio enhancement may involve any suitable audio enhancement means, including (but not limited to) automatic detection and attenuation of the speech-articulation noise event(s) within the input audio signal. Here, the term speech-articulation noise event may be understood in a broad sense, e.g., used to refer to a noise event that is somehow related to speech articulation or that is somehow caused by (i.e., resulting from) speech articulation.

In particular, the method may comprise segmenting (e.g., by using one or more suitable windows) the input audio signal into a number of audio frames (e.g., of size of 100 ms). The method may further comprise obtaining (e.g., determining, calculating, extracting, etc.) at least one feature parameter from the (segmented) audio frames. In some possible example implementations, the feature parameter so obtained may be considered to be associated with a type of the (to-be-detected) speech-articulation noise event. That is to say, in some possible example implementations, depending on the type of the (to-be-detected) speech-articulation noise event, different feature parameters may be necessary to be obtained from the audio frames (e.g., in the sense that feature parameters may be chosen in accordance with a speech-articulation noise event to be detected). The method may yet further comprise determining (e.g., detecting, calculating, etc.), based at least in part on the obtained feature parameter, a respective type of the speech-articulation noise event and a respective range (e.g., time and/or frequency range) associated with the speech-articulation noise event within the input audio signal.

Configured as described above, the proposed method can provide an efficient and flexible mechanism for determining (detecting) potential speech-articulation noise event(s) (e.g., artifacts) comprised within the input audio signal. Thereby, appropriate further enhancement (post-)processing (e.g., attenuation) may be facilitated. As a result, tedious manual editing/processing previously required for identifying and attenuating the noise event(s) in the audio signal can be largely avoided. At the same time, the listening experience (at the listener side) can be greatly improved.

In some example implementations, the determined range may comprise at least one boundary of the determined speech-articulation noise event, in the time and/or spectral domain. That is, the range so determined by the proposed method may comprise information indicative of one or more boundaries of the (detected) speech-articulation noise event. More particularly, as will be understood and appreciated by the skilled person, such boundary may be in the time domain, the spectral domain, or both.

In some example implementations, the method may further comprise attenuating the speech-articulation noise event in accordance with the determined type and range thereof. As will be understood and appreciated by the skilled person, the attenuation may be performed by any suitable means, e.g., by applying a suitable attenuation gain according to the determined type and range of the speech-articulation noise event.

In some example implementations, the speech-articulation noise event may comprise at least one of: a mouth click event or a speech plosive event. As mentioned above, broadly speaking, there may be typically two possible types of unwanted/undesirable "noise" that speech enhancement algorithms generally seek to address, i.e., noise produced by background sources and noise produced by articulation. Plosive sounds belong to the second type. They occur when a burst of air is generated from the mouth (as during the pronunciation of syllables containing a "p" or "t") and causes a large oscillation of the microphone's diaphragm as in the case of wind impact. As indicated above, in the context of the present disclosure, the term "plosive" is broadly used to include any burst of air from the mouth that causes large oscillations of the microphone's diaphragm (e.g., including short fricative sounds like "f", "z"). Even for speech content recorded in well-controlled acoustic environments, plosives often produce a sudden low frequency boost, so-called "pop", resulting in unpleasant listening experience. On the other hand, mouth clicks are another type of transient sounds caused by the speech articulation using tongue/teeth/lips mixed with saliva. They may occur in the speech part as well as the non-speech part, often audible for high SNR recordings through headphones/earphones. Mouth clicks are short in general, often of a duration between 10-100 ms and they can also appear as several consecutive transients. Of course, as will be understood and appreciated by the skilled person, the proposed method(s) may likewise be applied to detecting (and optionally attenuating) any other suitable speech-articulation noise event(s).

In some example implementations, the speech-articulation noise event may comprise one or more mouth click events. Particularly, the one or more mouth click events may comprise at least one of: a non-speech click event, a speech click event, or a lip smack event. Broadly speaking, as will be understood and appreciated by the skilled person, the lip smacks may in some cases be seen as a special kind of non-speech clicks, which may often occur right before speech starts. The lip smacks may usually be made intentionally and therefore appear as a strong and long transient event. In the context of the methods proposed by the present disclosure, lip smack events may generally be detected separately from non-speech click events.

In some example implementations, after segmenting the input audio signal into a number of audio frames, the method may further comprise classifying (e.g., determining) the audio frames as either speech frames or non-speech frames. That is, the segmented audio frames may be individually determined, e.g., according to whether that audio frame contains speech or not, as a speech frame (i.e., containing speech) or a non-speech frame (i.e., not containing speech). As will be understood and appreciated by the skilled person, such classification may be performed in any suitable manner.

In some example implementations (without intended limitation), the input audio signal may be identified and segmented into the speech frames and the non-speech frames by using a voice activity detector (VAD). That is, the VAD may be used for identifying whether each (segmented) audio frame/block (e.g., short-time audio frame/block) contains speech or not. The mouth clicks found in the non-speech part may be referred to as "non-speech clicks" and those found in the speech part may be referred to as "speech clicks", which are detected separately. As illustrated above, lip smacks are a special kind of non-speech clicks (often occurring right before speech starts), which, in the context of the present disclosure, may be detected separately from the non-speech clicks.

In some example implementations, the segmentation may be performed by using two different window sizes. Particularly, one of the two window sizes may be shorter (smaller) than the other.

In some example implementations, the shorter (smaller) window size may be used (mainly) for detecting speech click events in the speech frames, and the longer window size may be used (mainly) for detecting non-speech click events in the non-speech frames. As such, both short and long transient events may be efficiently and reliably detected. In some possible implementations, (one or more) hop sizes that are sufficiently small may be optionally used for achieving fine time resolution, as will be appreciated by the skilled person.

In some example implementations, obtaining at least one feature parameter from the audio frames may comprise, for each audio frame, obtaining at least one measure of kurtosis based on time-domain sample amplitudes of the audio frames. In addition, determining, based on the obtained feature parameter, a respective type of the speech-articulation noise event and a respective range thereof in the input audio signal may comprise: comparing the obtained measure of kurtosis to a predefined kurtosis threshold; and if the measure of kurtosis exceeds the predefined kurtosis threshold, determining that the audio frame comprises a mouth click event, and determining start and end boundaries of the mouth click event based on respective positions at which the measure of kurtosis rises above and falls below the predefined kurtosis threshold. Notably, by using the measure of kurtosis, estimation (e.g., determination) of a first (rough) range of the mouth click event(s) can be achieved in an efficient manner, which enables further refinement, if necessary.

In some example implementations, obtaining at least one feature parameter from the audio frames may comprise, for each speech frame, obtaining a respective approximation of residual without speech harmonic components and a respective first measure of kurtosis of (time-domain) sample amplitudes for the approximation of residual. In addition, determining, based on the obtained feature parameter, a respective type of the speech-articulation noise event and a respective range thereof in the input audio signal may comprise: comparing the obtained first measure of kurtosis to a first predefined kurtosis threshold; and if the first measure of kurtosis exceeds the first predefined kurtosis threshold, determining that the speech frame comprises a speech click event, and determining start and end boundaries of the speech click event based on respective positions at which the first measure of kurtosis rises above and falls below the first predefined kurtosis threshold. As noted above, by using the measure of kurtosis, a first (rough) range of the mouth click event(s) can be estimated (e.g., determined) in an efficient manner, which enables further refinement, if necessary.

In some example implementations, the approximation of residual without speech harmonic components may be a second-order waveform difference.

In some example implementations, the method may further comprise obtaining a second measure of kurtosis from residual sample amplitudes of the speech frame. In particular, the type and range of the speech-articulation noise event may be determined based on the second measure of kurtosis relative to the first measure of kurtosis. As a non-limiting example, determining the type and range of the speech-articulation noise event based on the second measure of kurtosis relative to the first measure of kurtosis may involve determining the type and range of the speech-articulation noise event based on a difference between the second measure of kurtosis and the first measure of kurtosis.

In some example implementations, the method may further comprise refining (e.g., limiting) the determined (rough) range of the speech click event by: locating a sample position with the largest second-order difference within the determined range of the speech click event; and determining the refined range of the speech click event by applying a predefined speech click event duration (e.g., 5 ms) around (e.g., before and after, possibly centered on) the located sample position. As a further non-limiting example, the refined range of the speech click event may be determined as half of the predefined speech click event duration (e.g., 2.5 ms) before the located sample position and half of the predefined speech click event duration (e.g., 2.5 ms) after the located sample position. Of course, any other suitable measures may be adopted, depending on respective implementations.

In some example implementations, the method may further comprise determining the range of the speech click event further based on a min/max change rate calculated from local minima and maxima in the speech frame. Broadly speaking, this range determination (or refinement) process may be generally seen as to detect the fast modulation within the (rough) click range. Particularly, in some possible implementations, by means of converting local minima/maxima into e.g. −1 and +1 values, the corresponding zero-crossing rate, hereinafter referred to as "min/max change rate", may be used to characterize how fast the modulation is.

In some example implementations, obtaining at least one feature parameter from the audio frames may comprise, for each non-speech frame, obtaining a respective third measure of kurtosis of time-domain sample amplitudes in the non-speech frame. In addition, determining, based on the obtained feature parameter, a respective type of the speech-articulation noise event and a respective range thereof in the input audio signal may comprise: comparing the obtained third measure of kurtosis to a second predefined kurtosis threshold; and if the third measure of kurtosis exceeds the second predefined kurtosis threshold, determining that the non-speech frame comprises a non-speech click event; and determining start and end boundaries of the non-speech click event based on respective positions at which the third measure of kurtosis rises above and falls below the second predefined kurtosis threshold.

In some example implementations, the method may further comprise, if two neighboring non-speech click events are within a predefined gap threshold, merging (e.g., merging for purposes of attenuation) the two neighboring non-speech click events into a single speech click event. Broadly speaking, non-speech clicks typically tend to be relatively long (e.g., 50 ms). Thus, in some cases, it may be beneficial to merge neighboring clicks within by a pre-defined gap or threshold, for instance, 25 ms.

In some example implementations, the method may further comprise, for a determined non-speech click event in a non-speech frame immediately preceding a speech frame, calculating a high/low-band peak ratio as an amplitude ratio between the largest peak above a predefined frequency and the largest peak below the predefined frequency; and if the calculated high/low-band peak ratio is above a predefined ratio threshold, determining the non-speech click event as a lip smack event.

In some example implementations, the high/low-band peak ratio may be calculated as an amplitude ratio between the largest peak above a predefined frequency (e.g., 1.5 kHz) and the largest peak below the predefined frequency but above a further predefined low frequency (e.g., 100 Hz). Generally speaking, the predefined frequency may be so selected as the limit frequency from which harmonics are dominant. Of course, as will be understood and appreciated by the skilled person, any other suitable ways of calculation may be adopted, depending on various implementations and/or requirements.

In some example implementations, the method may further comprise refining the determined range of the lip smack event based on the high/low-band peak ratio, a spectral slope and/or an energy envelope.

In some example implementations, refining the determined range of the lip smack event may comprise extending the end position of the lip smack event determined by using the third measure of kurtosis as long as: the high/low-band peak ratio is above the predefined ratio threshold, the spectral slope is below a predefined slope threshold and/or energy in the energy envelope decreases.

In some example implementations, the method may further comprise determining the speech-articulation noise event further based on the center of gravity (COG) calculated for the speech frames in accordance with a further predefined threshold, for distinguishing mouth click events from speech transients. Broadly speaking, speech transients may typically share similarity in nature to mouth clicks, but may generally be of different magnitude or spectral characteristics. Based on the evolution of VAD and/or COG (the mean time of signal) of the short-time speech waveform (the waveform of a short-time frame in the time domain), it may be possible to identify speech transients and therefore avoid false-alarm detection as mouth clicks.

In some example implementations, the method may further comprise attenuating the determined one or more mouth click events based on respective spectral gains derived from spectral envelopes of the audio frames containing the detected mouth click events and target envelopes calculated based on respective reference frames.

In some example implementations, for each detected mouth click event, the reference frames may comprise an audio frame before the audio frame containing the detected mouth click event and an audio frame thereafter. Further, the target envelope may be calculated by interpolating spectral envelopes of the reference frames. Of course, as will be understood and appreciated by the skilled person, any other suitable ways of calculation may likewise be adopted, depending on respective implementations and/or requirements.

In some example implementations, the attenuation may be applied for frequency bands higher than a predefined high frequency threshold (e.g., 4 kHz). To be more specific, in some possible implementations, a further constraint could be optionally applied for speech clicks, to allow high frequency attenuation only (above 4 kHz, for example) in order to avoid unintentionally modifying speech harmonics.

In some example implementations, the method may further comprise replacing the determined one or more mouth click events based on respective neighboring audio frames. To be more specific, in some possible implementations, it might also be possible, for the correction of speech clicks, to use autoregressive modeling or the granular-based approach similar to pitch-synchronous waveform modeling. That is, given the click event position, it may be possible to estimate the local period to the left and to the right. By means of comparing the neighboring periods, the "waveform slice" matching the relative click position within the period may be used to replace the click with simple crossfade. In some possible implementations, to select the left or the right period for the correction, it may be possible to simply choose the one with the smaller waveform differences. Of course, as will be understood and appreciated by the skilled person, any other suitable means may be adopted, depending on respective implementations and/or requirements.

In some example implementations, the speech-articulation noise event may comprise at least one speech plosive event. In addition, obtaining at least one feature parameter from the audio frames may comprise obtaining a respective measure of low frequency energy (LFE) for each of the audio frames, for identifying outliers thereof.

In some example implementations, the measure of LFE may be calculated either in the time domain or in the spectral domain. As will be understood and appreciated by the skilled person, any suitable means may be adopted for calculating the measure of LFE, depending on respective implementations and/or requirements. As a non-limiting example, in some possible implementations, for the time domain case, the LFE may be calculated as the root mean square (RMS) energy of the lowpass filtered signal. In some possible implementations, the lowpass filter could for example be a 4-th order Butterworth filter with a pre-defined cutoff frequency at, for example, 80 Hz. In some other possible implementations, for the spectral domain case, the LFE may be calculated from the spectrum as the RMS energy below the cutoff frequency.

In some example implementations, the method may further comprise determining the range of the speech plosive event in accordance with the outliers identified from the measure of LFE and a threshold calculated based on the measure of LFE; or in accordance with an LFE ratio calculated from the previous and current audio frames.

In some example implementations, the method may further comprise obtaining a respective measure of zero crossing maximum (ZCM) for each of the audio frames, for refining the range of the speech plosive event that has been determined based on the measure of LFE. Particularly, the measure of ZCM may be seen as indicative of a length of the maximum interval of consecutive zero crossings within the audio frame. In some possible implementations, the measure of ZCM may be further normalized by the window size (e.g., the size of the window that is used for segmenting the audio frames).

In some example implementations, the method may further comprise attenuating the determined speech plosive event. The attenuation may be performed either in the time domain or in the spectral domain.

In some example implementations, the time domain attenuation may be performed by applying a high-pass filter (e.g., a Butterworth high-pass filter). In particular, in some possible implementations, a cut-off frequency of the filter may be determined based on the measures of ZCM for the audio frames within the range of the determined speech plosive event; and an order of the filter may be determined based on the measures of LFE for the audio frames within the range of the determined speech plosive event. Of course, as will be understood and appreciated by the skilled person, any other suitable high-pass filter, or more generally, any other suitable time domain attenuation may be determined and used, depending on various implementations and/or requirements.

In some example implementations, the spectral domain attenuation may be performed by using overlap-and-add short-time Fourier Transform (STFT) with adaptive spectral slope and frequency.

In some example implementations, the spectral domain attenuation may involve processing the audio frames with fast Fourier Transform (FFT), applying an attenuation gain with adaptive slope and frequency, applying inverse FFT, windowing and overlap-adding in order to produce an attenuated output audio signal. In particular, in some possible implementations, the frequency may be determined based on the measures of ZCM for the audio frames within the range of the determined speech plosive event; and the slope may be determined based on the measures of LFE for the audio frames within the range of the determined speech plosive event. Of course, as will be understood and appreciated by the skilled person, any other suitable spectral domain attenuation may be adopted, depending on respective implementations and/or requirements.

In some example implementations, the method may further comprise applying noise spectrum estimation for limiting the attenuation gain to prevent over-suppression. That is to say, in some possible implementations, the noise spectrum estimation may be used to limit the gain reduction such that the attenuation does not affect the overall spectral profile of the noise spectrum, particularly in the low frequency region.

Configured as above, the proposed method of the present disclosure generally attenuates faster pops with higher cutoff frequency, therefore effectively adapting to the pitch of the speakers voice. Further, it also attenuates stronger pops with steeper cutoff frequency slope, therefore effectively adapting to weak and strong plosives.

In some example implementations, the method may further comprise applying a content classifier (e.g., a VAD) to the audio frames for distinguishing speech frames from non-speech frames in order to determine the speech plosive event. To be more specific, in some possible implementations, when techniques described above are applied to content that includes music, or speech and music, the proposed algorithm may be sensitive to low-frequency transients such as those generated by kick drum or bass. To address this concern, in some possible implementations, a content classifier (e.g., a voice/music activity detector), computing the probability p(n) that a given frame n contains speech, may be used to modify the detection or attenuation parameters, thereby ensuring the music content is not affected by the deplosive processing.

In some example implementations, the spectral domain attenuation may involve: producing, by using an analysis filterbank, a number of approximately equivalent rectangular bandwidth (ERB) spaced frequency bands below and a number of bands above a predefined frequency threshold, the predefined frequency threshold being within the frequency range of the determined speech plosive event; applying a number of attenuation gains respectively to audio signals in each of the frequency bands, wherein the attenuation gains are calculated based on energies calculated for the frequency bands; and feeding the attenuated audio samples to a synthesis filterbank for generating an output audio signal. Compared to the above illustrated spectral domain attenuation, this spectral domain attenuation may generally be used when computational complexity permits.

In some example implementations, the attenuation gain in each frequency band may be further constrained to not reduce the energy of that frequency band below an estimated noise floor in that frequency band. In other words, in some possible implementations, the (attenuation) gains may be clipped to ensure that the power in each band is not reduced below the estimated noise floor in the respective band. Generally speaking, this would avoid an audible dip in the noise when there is a plosive in the presence of significant background noise. As will be understood and appreciated by the skilled person, the noise (or noise floor) may be estimated by using any suitable means.

In some example implementations, the method may further comprise calculating a time smoothed low frequency energy estimate of audio samples above the estimated noise floor, for distinguishing speech plosive events from higher frequency contents in the input audio signal.

In some example implementations, the method may further comprise calculating a measure of speech harmonic protection in the spectrum of the input audio signal; and calculating the attenuation gains in accordance with the measure of speech harmonic protection and with the time smoothed low frequency energy estimate.

In some example implementations, the measure of speech harmonic protection may be a measure of periodicity or tonality.

In some example implementations, the measure of periodicity in the spectrum may be calculated from a cepstrum of the audio samples prior to the final band calculations of the analysis filterbank.

In some example implementations, the measure of tonality in the spectrum may be calculated based on the main lobe of a spectral peak compared to that of a sinusoidal peak prior to the final band calculations of the analysis filterbank.

In some example implementations, the method may further comprise further constraining the calculated attenuation gain based on the frequency band immediately lower in frequency. As a non-limiting example, the gains may be constrained so that for bands above a certain threshold, e.g. 70 Hz, the gain may not be attenuated more than the band immediately lower in frequency. Generally speaking, this would enforce the reduction or attenuation to follow the physical reduction of the plosive energy with frequency. That is to say, when a lower band is significantly reduced in energy, if the next higher band has more energy it is more likely to be genuine speech energy rather than plosive related energy. Broadly speaking, the very lowest bands (below e.g., 70 Hz) may not follow this trend, for example, excess 60 Hz mains hum may make one band louder, or a DC blocking filter may attenuate the lowest bands, and this should not restrict attenuation of plosive energy.

According to another aspect of the disclosure, a method of performing automatic audio enhancement on an input audio signal for detecting and/or attenuating at least one speech-articulation noise event contained therein is provided. As will be understood and appreciated by the skilled person, the automatic audio enhancement may involve any other suitable audio enhancement means. In particular, the speech-articulation noise event may comprise, among others, at least one speech plosive event.

More particularly, the method may comprise producing, by using an analysis filterbank, a number of approximately equivalent rectangular bandwidth (ERB) spaced frequency bands below and a number of bands above a predefined frequency threshold, the predefined frequency threshold being within frequency range of the speech plosive event. The method may further comprise applying a number of attenuation gains respectively to audio signals in each of the frequency bands, wherein the attenuation gains are calculated based on energies calculated for the frequency bands. The method may yet further comprise feeding the attenuated audio samples to a synthesis filter bank for generating an output audio signal.

Configured as described above, broadly speaking, the proposed method provides an efficient and flexible mechanism for determining (detecting) and attenuating possible/potential speech-articulation noise event(s) (e.g., speech plosive events) comprised within the input audio signal. Thereby, tedious manual editing/processing previously required for identifying and attenuating the noise (e.g., plosive) event(s) in the audio signal can be largely avoided. At the same time, the listening experience (at the listener side) can be greatly improved.

In some example implementations, the attenuation gain in each frequency band may be further constrained to not reduce the energy of that frequency band below an estimated noise floor in that frequency band. In other words, in some possible implementations, the (attenuation) gains may be clipped to ensure that the power in each band is not reduced below the estimated noise floor in the respective band. Generally speaking, this would avoid an audible dip in noise when there is a plosive in the presence of significant background noise. As will be understood and appreciated by the skilled person, the noise (or noise floor) may be estimated by using any suitable means.

In some example implementations, the method may further comprise calculating a time smoothed low frequency energy estimate of audio samples above the estimated noise floor, for distinguishing speech plosive events from higher frequency contents in the input audio signal.

In some example implementations, the method may further comprise calculating a measure of speech harmonic protection in the spectrum of the input audio signal; and calculating the attenuation gains in accordance with the measure of speech harmonic protection and with the time smoothed low frequency energy estimate.

In some example implementations, the measure of speech harmonic protection may be a measure of periodicity or tonality.

In some example implementations, the measure of periodicity in the spectrum may be calculated from a cepstrum of the audio samples prior to the final band calculations of the analysis filterbank.

In some example implementations, the measure of tonality in the spectrum may be calculated based on the main lobe of a spectral peak compared to that of a sinusoidal peak prior to the final band calculations of the analysis filterbank.

In some example implementations, the method may further comprise further constraining the calculated attenuation gain based on the frequency band immediately lower in frequency. As a non-limiting example, the gains may be constrained so that for bands above a certain threshold, e.g. 70 Hz, the gain may not be attenuated more than for the band immediately lower in frequency. Generally speaking, this would enforce the reduction or attenuation to follow the physical reduction of the plosive energy with increasing frequency. That is to say, when a lower band is significantly reduced in energy, if the next higher band has more energy it is more likely to be genuine speech energy rather than plosive related energy. Broadly speaking, the very lowest bands (below e.g., 70 Hz) may not follow this trend, for example, excess 60 Hz mains hum may make one band louder, or a DC blocking filter may attenuate the lowest bands, and this should not restrict attenuation of plosive energy.

In some example implementations, the input audio signal may be processed in continuous manner with a predefined look-ahead frame (window) size (e.g., 50 ms).

According to another aspect of the disclosure, an apparatus including a processor and a memory coupled to the processor is provided. The processor may be adapted to cause the apparatus to carry out all steps of the example methods described throughout the disclosure.

According to a further aspect of the disclosure a computer program is provided. The computer program may include instructions that, when executed by a processor, cause the processor to carry out all steps of the example methods described throughout the disclosure.

According to a yet further aspect, a computer-readable storage medium is provided. The computer-readable storage medium may store the aforementioned computer program.

It will be appreciated that apparatus features and method steps may be interchanged in many ways. In particular, the details of the disclosed method(s) can be realized by the corresponding apparatus (or system), and vice versa, as the skilled person will appreciate. Moreover, any of the above statements made with respect to the method(s) are understood to likewise apply to the corresponding apparatus (or system), and vice versa.

BRIEF DESCRIPTION OF DRAWINGS

Example embodiments of the disclosure are explained below with reference to the accompanying drawings, wherein.

DETAILED DESCRIPTION

Figure 1A:
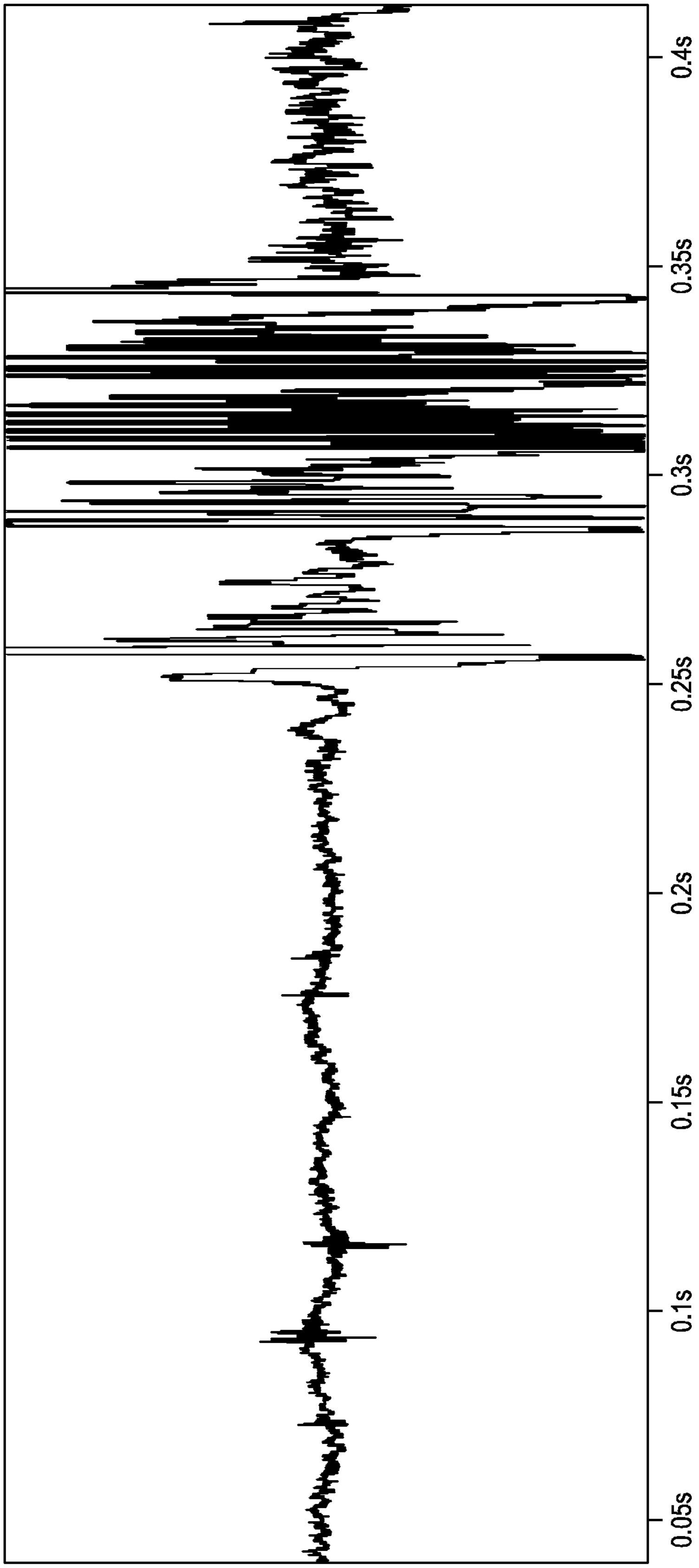
FIG. 1A is a schematic illustration of a diagram showing an example of non-speech clicks according to an embodiment of the present disclosure.

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Furthermore, in the figures, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

As indicated above, the increasing amount of speech content on various media platforms, which may often be of diverse quality, has reached a point where manual editing seems to be no longer a feasible solution. Automatic speech enhancement, when done right, would generally preserve speech naturalness and save editing time.

Broadly speaking, speech enhancement algorithms typically try to address two types of unwanted "noise" events, namely, noise produced by background sources and noise produced by articulation. Among others, plosive sounds and also mouth clicks both belong to the second type.

To be more specific, on the one hand, speech plosives often occur when a burst of air is generated from the mouth (as during the pronunciation of syllables containing a "p" or "t") and cause a large oscillation of the microphone's diaphragm as in the case of wind impact. As noted above, in the context of the present disclosure, the term "plosive" may be broadly used to include any burst of air from the mouth that causes large oscillations of the microphone's diaphragm (e.g., including short fricative sounds like "f", "z"). Even for speech content recorded in well-controlled acoustic environments, plosives may often produce a sudden low frequency boost, so-called "pop", resulting in an unpleasant listening experience. An illustrative example of the speech plosive events may be seen from for example diagram 8200 in FIG. 8 (in particular the white portions in the low frequency part, which will be discussed in more detail later).

Several recording techniques have been proposed to reduce plosive strength, such as using a pop filter or a wind shield, speaking off-axis, etc. However, the "pop" reduction is not as effective as intended for practical reasons: for example, one cannot fix the speakers' or (voice) actors' posture. Therefore, signal processing tools are necessary to improve the quality of such recordings. There are two main feasible approaches for automatic plosive detection, including simple feature-based detection and phone-based detection (multi-dimensional features for speech recognition). Although the phone-based detection may seem to have its advantage in identifying the precise time spans of a plosive event, it is more complex and thus requires more resources to calculate. The simple feature-based detection is often naïve, without refinement of plosive event boundaries. Another feasible solution generally provides three user parameters (sensitivity/strength/frequency limit) for its deplosive module. In order to get the best result, however, users might need to manually edit the automation curve for these parameters because plosives vary in strength and frequency in the same recording, and users may want to attenuate them accordingly. As a result, this process might be time consuming.

On the other hand, mouth clicks are generally the transient sounds caused by the speech articulation using tongue/teeth/lips mixed with saliva. They typically occur in the speech part as well as the non-speech part, often audible for high SNR recordings through headphones/earphones. Mouth clicks are short in general, often of a duration between 10-100 ms and they can also appear as several consecutive transients. In the context of professional recordings such as TV/film/game dialogues, click-free speech quality may be considered very demanding. Nowadays, even for user-generated contents, the mouth clicks tend to become very audible because of the popularity of earphone/headphone listening.

In the context of the present disclosure, the proposed method generally seeks to address three types of mouth clicks, namely: 1) non-speech clicks; 2) speech clicks; and 3) lip smacks (which may also be considered as a special kind/type of non-speech clicks).

Figure 1B:
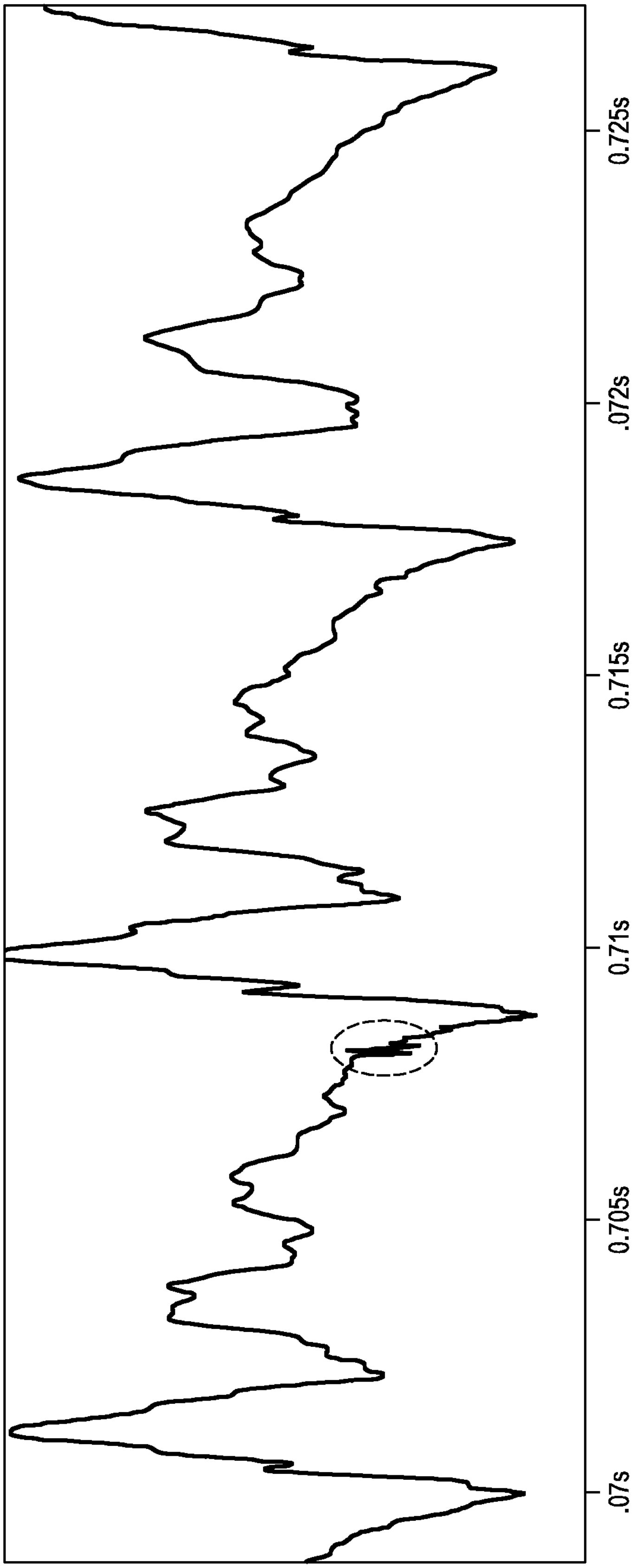
FIG. 1B is a schematic illustration of a diagram showing an example of speech clicks according to an embodiment of the present disclosure.
Figure 1C:
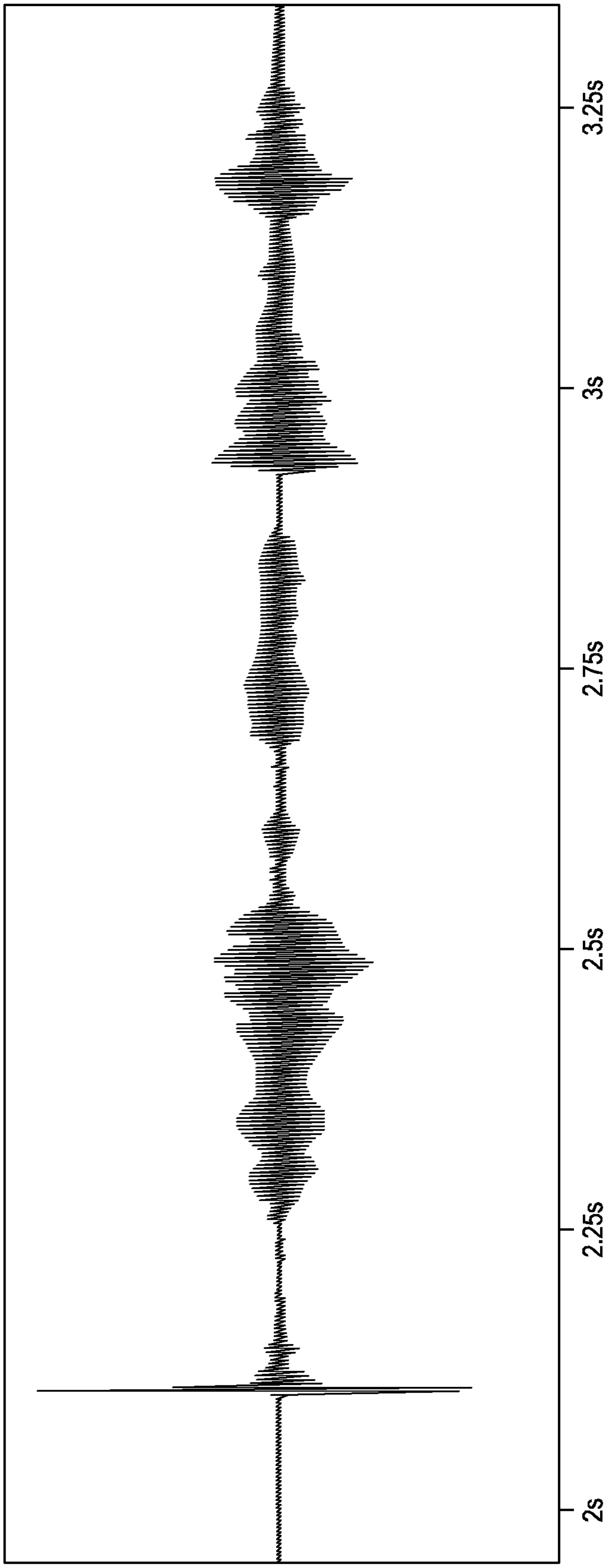
FIG. 1C is a schematic illustration of a diagram showing an example of lip smacks according to an embodiment of the present disclosure.

Referring now to the figures, FIG. 1A schematically illustrates an example of non-speech clicks (e.g., at approximately 0.1 s); FIG. 1B schematically illustrates an example of speech clicks (shown in particular at the end of the left-most cycle at approximately 0.7056 s, indicated by a circle); and FIG. 1C schematically illustrates an example of lip smacks (shown in particular as a strong transient right before the speech segment at approximately 2.1 s).

Several recording techniques have been proposed to reduce mouth clicks for professional voice actors/actresses. However, in most situations there is no way to control the speaker's mouth/lip condition. For post-processing, manual editing may be tedious, which renders it impractical for dealing with hundreds/thousands of items of dialogue. Therefore, signal processing tools are necessary to more efficiently correct mouth clicks. However, there seems to be currently little academic research available on the detection of mouth clicks. The detection of lip smacks could be considered a similar problem but the transient energy is usually much larger, so respective methods might not apply directly to small transients like mouth clicks. Further, in the context of digital audio restoration, "De-click" generally serves to remove impulsive noise often present in the playback of gramophone records. When the damaged audio duration is long, the problem becomes a general signal interpolation/extrapolation problem.

In view thereof, the present disclosure presents methods to perform automatic audio enhancement on input audio signal(s) including one or more of such speech-articulation (related or caused) noise events. More particularly, the present disclosure seeks to provide methods to perform automatic detection and attenuation of, among other noise events, speech plosives and mouth clicks comprised within the input audio signal, thereby avoiding manual editing, while at the same time preserving or even improving audio quality at the listener side.

Firstly, methods relating to "de-click" according to embodiments of the present disclosure will be discussed.

In a broad sense, the methods for automatic detection and attenuation of mouth clicks described in the present disclosure mainly include two key aspects. That is, as a first aspect, the detection algorithm generally targets mouth clicks in the non-speech region and those in the speech region respectively. The kurtosis measure of the waveform amplitudes is generally used as the main criterion, which applies to both the original waveforms and also its 2nd-order difference, where the $2^{nd}$ order difference serves as an approximation to the non-harmonic signal parts. The roughly detected click positions are further refined to more accurately define the click sample regions. In addition, as a second aspect, the attenuation of mouth clicks is generally based on spectral gain attenuation which is derived from spectral envelope interpolation across the short-time frames containing the (detected) clicks.

The "de-click" methods will now be discussed in more detail with reference to FIG. 6, which generally provides a schematic functional overview of (de-click) techniques according to embodiments of the present disclosure.

To be more specific, as shown in block 6010, an input audio signal may be provided, e.g., in the form of an input file or stream (or in any other suitable forms). Depending on the form (e.g., format) thereof, the input audio signal may need to undergo a suitable segmentation process to be divided into, for example, a number of (short-time) audio frames (e.g., with equal or different frame sizes).

Notably, before proceeding to the subsequent declick processing, an optional denoising process (shown as the dashed block 6020) could be applied to the input signal to better reveal the underlying mouth clicks.

Then, given a voice activity detector (VAD) as exemplified in block 6030, each short-time block (audio frame) of a speech signal can be identified as containing speech or not. This allows to treat mouth clicks in speech parts (e.g., frames) and non-speech parts separately. The mouth clicks found in the non-speech parts are generally called "non-speech clicks" (e.g., as shown in FIG. 1A) and those found in the speech parts are called "speech clicks" (e.g., as shown in FIG. 1B), which are detected separately. As indicated above, in the context of the present disclosure, lip smacks are generally considered as a special kind of non-speech clicks, which often occur right before the speech starts. Lip smacks are usually made intentionally and therefore appear as a strong and long transient event (e.g., as shown in FIG. 1C). Therefore, in order to detect both short and long transient events, it may be considered beneficial to use two (different) window sizes. Particularly, in some possible implementations, the shorter (smaller) window size may be used (mainly) for detecting speech click events in speech frames and the longer window size may be used (mainly) for detecting non-speech click events in non-speech frames. As such, both short and long transient events may be efficiently and reliably detected. Additionally, in some possible implementations, hop sizes sufficiently small may also be used for achieving fine time resolution.

On the one hand, for the detection of non-speech click events, although weak in energy, they are generally stronger than the background noise and thus can be identified by the transient detection algorithms. In the present disclosure, it is generally proposed to use a (first) measure of kurtosis of the short-time waveform (time-domain) amplitudes $k_w$ (block 6040) to identify and distinguish a peaky distribution (in some cases also referred to as large outliers) from a flat distribution. The measure of kurtosis $k_w$ may then be compared to a predefined threshold (block 6100) to detect (or determine) the mouth clicks (in the present case, the non-speech clicks) as shown in block 6060. The start and/or end position(s) of the so-detected non-speech click event(s) may then be simply defined as the position(s) of which the kurtosis rises above and/or drops below the predefined threshold. Generally speaking, non-speech clicks may tend to be relatively long (e.g., 50 ms) and thus it may be, in some cases, beneficial to merge (for purposes of attenuation, for example) neighboring click events that are within a predefined gap/threshold, for instance, 25 ms.

On the other hand, as to the detection of speech clicks, it is generally considered that mouth clicks in voiced speech tend to appear as fast modulation and are consequently more difficult to detect. Ideally, if the speech harmonics are well modelled, it might rely on the residual waveform (subtracting harmonics) to detect any abrupt changes. However, this would generally involve using a robust F0 (also referred to as fundamental frequency)/harmonics estimation algorithm which might increase the complexity of the detection algorithm. Therefore, in the present disclosure, it is generally proposed to use the $2^{nd}$-order sample difference (block 6050) to approximate the removal of slow changing signal components (harmonics) such that the underlying transients can be revealed. Similar to the detection of non-speech clicks, a (second) measure of short-time kurtosis $k_D$, may be calculated for the difference (residual) waveform (block 6040 again). However, as the skilled person will understand, also other forms of residual signals apart from the $2^{nd}$-order sample difference may be used at this stage, as long as they allow identifying underlying transients.

In some possible implementations, the (second) measure of kurtosis $k_D$, may be evaluated with respect to (or relative to) the (first) measure of kurtosis $k_W$. More specifically, $$k_R = k_D) - \alpha \times k_W \quad (1)$$

where α is a (e.g., predefined) weighting parameter.

Since speech clicks usually happen in the voiced part, the harmonic energy may be quite strong and therefore appear as smooth amplitude distribution (which generally means that $k_W$ would be relatively small). As a result, this implicitly avoids detecting the speech transients (which generally means the peaky amplitude distribution, or in other words $k_W$ is large) as mouth clicks. That is, $k_R$ would be comparatively large for speech clicks, but comparatively small for speech transients, which allows to distinguish between the two.

Further, speech clicks may tend to be very short and therefore it may generally be necessary to refine the above-defined (rough) click event position with better sample precision.

A simple method may be to locate the largest second-order difference (which generally means the fastest changes) within the rough click range detected by kurtosis. Then, a pre-defined speech click duration of, 5 ms for example, can be used to determine the refined start and/or end position around the fastest changing sample position. As will be understood and appreciated by the skilled person, this may be achieved in any suitable means. For instance (not as limitation), such speech click duration (e.g., 5 ms) may be simply evenly divided before and after said fastest changing sample position, in the sense that an interval corresponding to the speech click duration may be centered on said fastest changing sample position.

Figure 2:
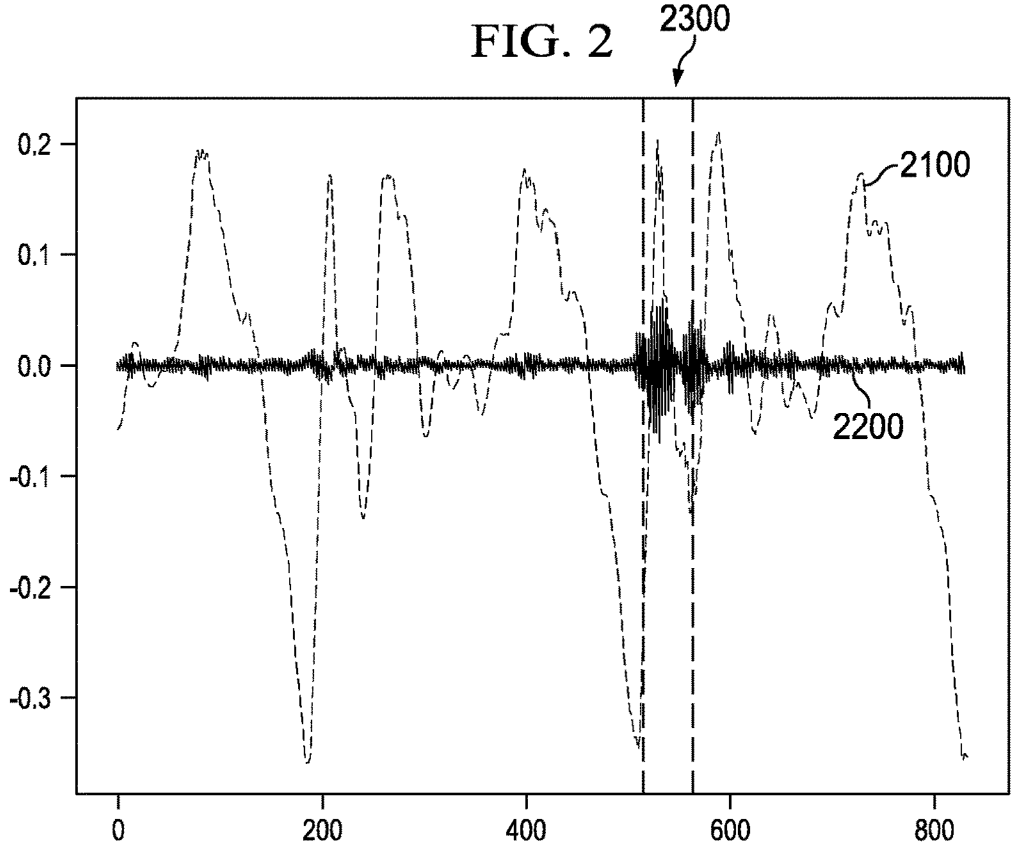
FIG. 2 is a schematic illustration of a diagram showing an example of detection and refinement of speech clicks according to an embodiment of the present disclosure.

An example of such refinement process is schematically shown in FIG. 2. In particular, in the example of FIG. 2, waveform 2100 generally shows an original input audio waveform, whereas waveform 2200 generally shows the $2^{nd}$-order difference waveform obtained from the original waveform 2100. Then, as illustrated above, a refined range 2300 of the non-speech click event can be determined based on the $2^{nd}$-order difference waveform 2200.

Another possible refinement method may be to detect the fast modulation within the rough click range. Particularly, by means of converting local minima/maxima into e.g. −1 and +1 values (or any other suitable values, for example with different sign and equal magnitude), the corresponding zero-crossing rate (ZCR), hereinafter also referred to as the "min/max change rate", may be used to characterize how fast the modulation is.

Figure 3:
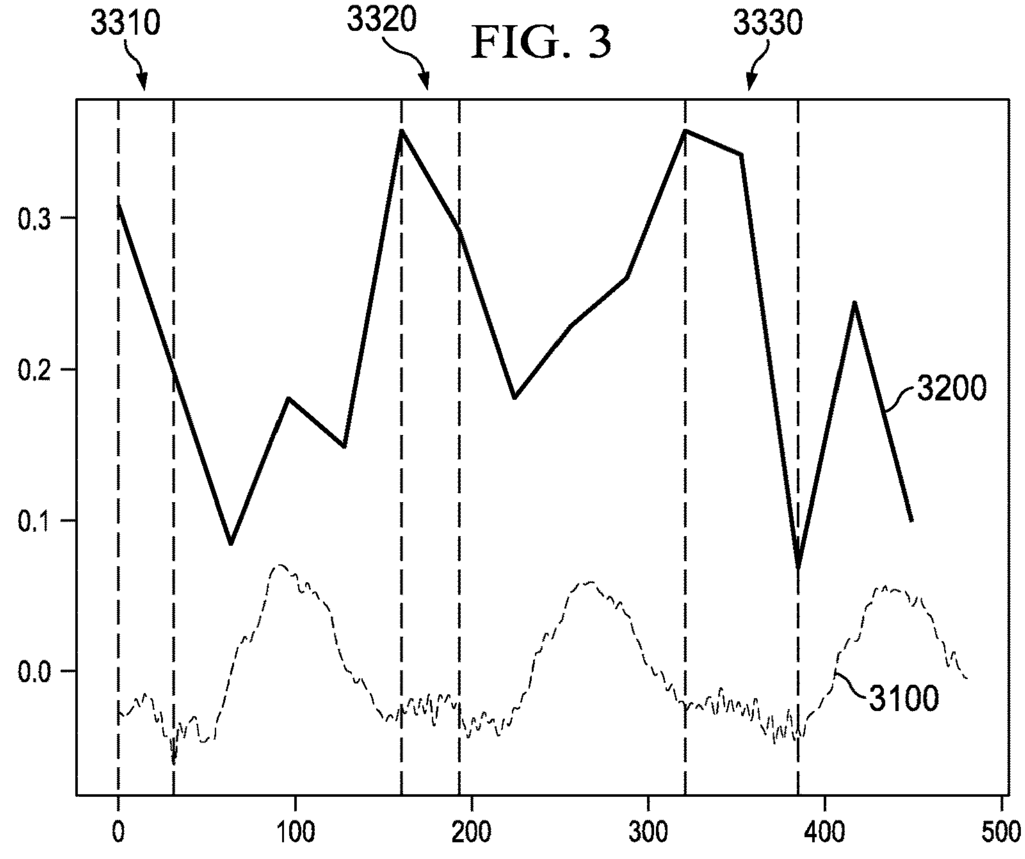
FIG. 3 is a schematic illustration of a diagram showing an example of detection and refinement of speech clicks according to another embodiment of the present disclosure.

An example of this refinement process is schematically shown in FIG. 3. In particular, in the example of FIG. 3, similar to that shown in FIG. 2, waveform 3100 generally shows an original input audio waveform. However, in this refinement process, instead of using the second order difference, the min/max change rate waveform 3200 is obtained from the original waveform 3100. Subsequently, the refined ranges 3310, 3320 and 3330 of the non-speech click events can be determined based on the min/max change rate waveform 3200, as shown in FIG. 3.

In some possible implementations, the thresholds of kurtosis and the min/max change rate may be used in combination for detecting speech clicks with better precision.

As to the detection of lip smacks, as noted above, lip smack events generally appear as a strong transient often right before speech (as shown in the example of FIG. 1C). In order to distinguish it from the aforementioned two click events (i.e., the speech clicks and the regular non-speech clicks), it may be considered to rely on verifying the sudden change of resonance, e.g., by means of using spectral features. In the present disclosure, it is generally proposed to use the spectral slope (hereinafter also denoted as "SpS") and also the high/low-band peak ratio (hereinafter also denoted as "ratioHL").

Generally speaking, in some possible implementations, the feature ratioHL may be calculated as the amplitude ratio between the largest peak above a pre-defined frequency $freq_{HL}$ (e.g., 1.5 kHz) and the largest peak below the $freq_{HL}$. In some possible implementations, it may be preferred to further select the largest peak in the lower band above a (pre-defined) low frequency $freq_L$ (e.g., 100 Hz) to avoid low-frequency noise.

In some possible implementations, for a non-speech click detected right before speech, it may be subsequently considered as a lip smack candidate (e.g., as shown in block 6070 of FIG. 6) if ratioHL>$th_R$, where $th_R$ can be a pre-defined threshold.

Typically, when lip smacks occur, the high/low-band peak ratio ratioHL may tend to become larger and also the spectral slope may tend to become steeper due to the high-frequency resonance. Since lip smack events are typically considerably longer (e.g., typically of 100 ms duration) compared to small (regular) mouth clicks, it may be generally proposed to refine the event start/end position(s) based on the features including ratioHL, SpS and energy envelope.

In some possible implementations, the initial (rough) end position (i.e., that is detected by $k_W$) may be continuously extended as long as one of the following conditions holds: 1) ratioHL>$th_R$; 2) SpS<$th_S$, where $th_S$ is a pre-defined threshold; and 3) the energy decreases.

An additional verification of the extended end position may be carried out by means of comparing the skewness before and after the event position refinement. That is, the extension of the event might only add samples of smaller amplitudes such that the sample amplitude distribution becomes "skewer".

Of course, as will be understood and appreciated by the skilled person, any other suitable implementations may be adopted as appropriate.

Figure 4:
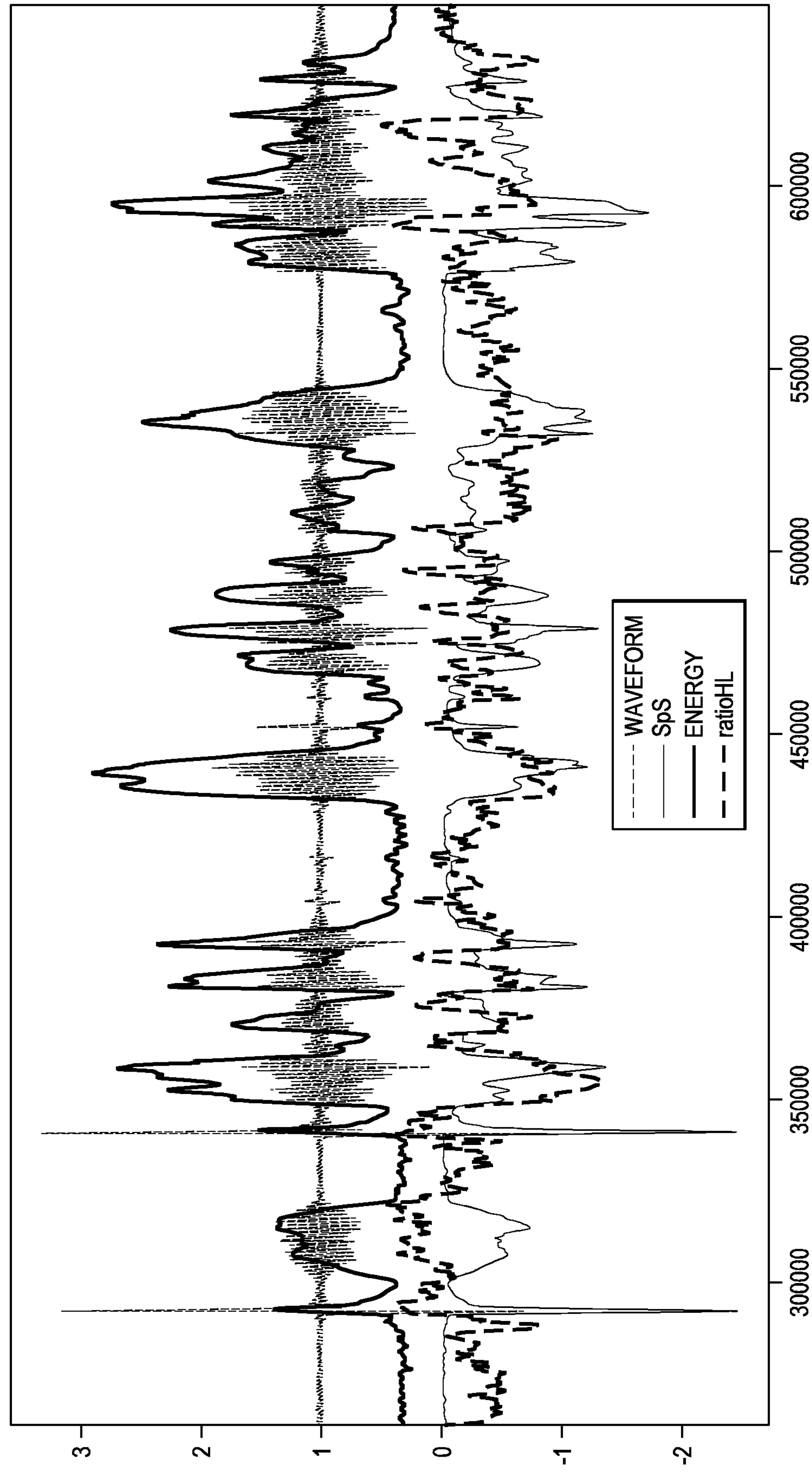
FIG. 4 is a schematic illustration of a diagram showing an example of detection of lip smacks according to an embodiment of the present disclosure.

FIG. 4 is a schematic illustration of a diagram showing an example of detection of lip smacks according to an embodiment of the present disclosure. Particularly, the waveforms in FIG. 4 generally and illustratively show the original waveform, the spectral slope (SpS), the energy and also the high/low-band peak ratio (ratioHL), respectively.

In some cases, it may be necessary or desired to avoid detecting speech transients as clicks. Particularly, speech transients may typically share some kind of similarity in nature to mouth clicks, but on the other hand are typically of different magnitude and/or spectral characteristics. Thus, based on the evolution of VAD and/or center of gravity (COG, which may generally be seen as the mean time of signal) of the short-time speech waveform, it may be possible to positively identify speech transients and therefore avoid false detection as mouth clicks.

In some possible implementations, the COG may be calculated as follows:

$$COG = \frac{\sum_{n=0}^{N-1} x[n]^2 \times (n - n_c)}{\sum_{n=0}^{N-1} x[n]^2} \text{ where } n_c = \frac{N-1}{2} \quad (2)$$

The beginning of a transient entering the right side of the window implies a positive value, which can be used for transient detection by means of COG>$th_{COG}$ where for instance $th_{COG}$=0.2. More specifically, when the VAD indicates no speech, the non-speech clicks would be processed regardless of the COG. Conversely, when the VAD indicates speech, then the clicks would not be processed if any COG is close to the start of a click event and is of a value above $th_{COG}$.

Broadly speaking, the reason of using a "normalized" measure (i.e., the COG) is to treat the speech transients more equivalently while using a "non-normalized" measure (i.e., the kurtosis) generally facilitates the selection of various levels of transientness for correction.

After the mouth clicks (including the non-speech clicks, the speech click, and also the lip smacks) have been detected, the attenuation (or correction) of those clicks (i.e., de-click processing) may be the next step.

To be more specific, the de-click processing as proposed in the present disclosure is generally based on spectral gain attenuation (block 6090 of FIG. 6) derived from the observed spectral envelopes (hereinafter denoted as "E") and the target envelopes (hereinafter denoted as "ET") as exemplified in block 6080 of FIG. 6. More particularly, in some possible implementations, given the start/end position(s) of the click, it is generally proposed to take one block before (with envelope $E_0$) and after (with envelope $E_1$) the click as reference frames. The spectral envelope of those two reference frames may then serve to estimate the target envelopes of each short-time block covering the click event. Then, in some possible implementations, the target envelope can be calculated simply as a linear interpolation of the two reference envelopes. Accordingly, the spectral gain is then defined by the target envelopes divided by the observed envelope, with the constraint of allowing attenuation only. That is, for each bin k at a given frame b across a total of B frames, the attenuation gain may be calculated as:

$$G[k] = \max\left(1, \frac{E_T[k]}{E[k]}\right) \text{ where} \quad (3)$$

$$E_T[k] = (E_1[k] - E_0[k]) \times \frac{b}{B}$$

Of course, as will be understood and appreciated by the skilled person, any other suitable implementations may be adopted as appropriate.

Particularly, for speech clicks, a further constraint may be optionally applied to allow for high frequency attenuation only (e.g., above 4 kHz), in order to avoid unintentionally modifying speech harmonics.

Figure 13:
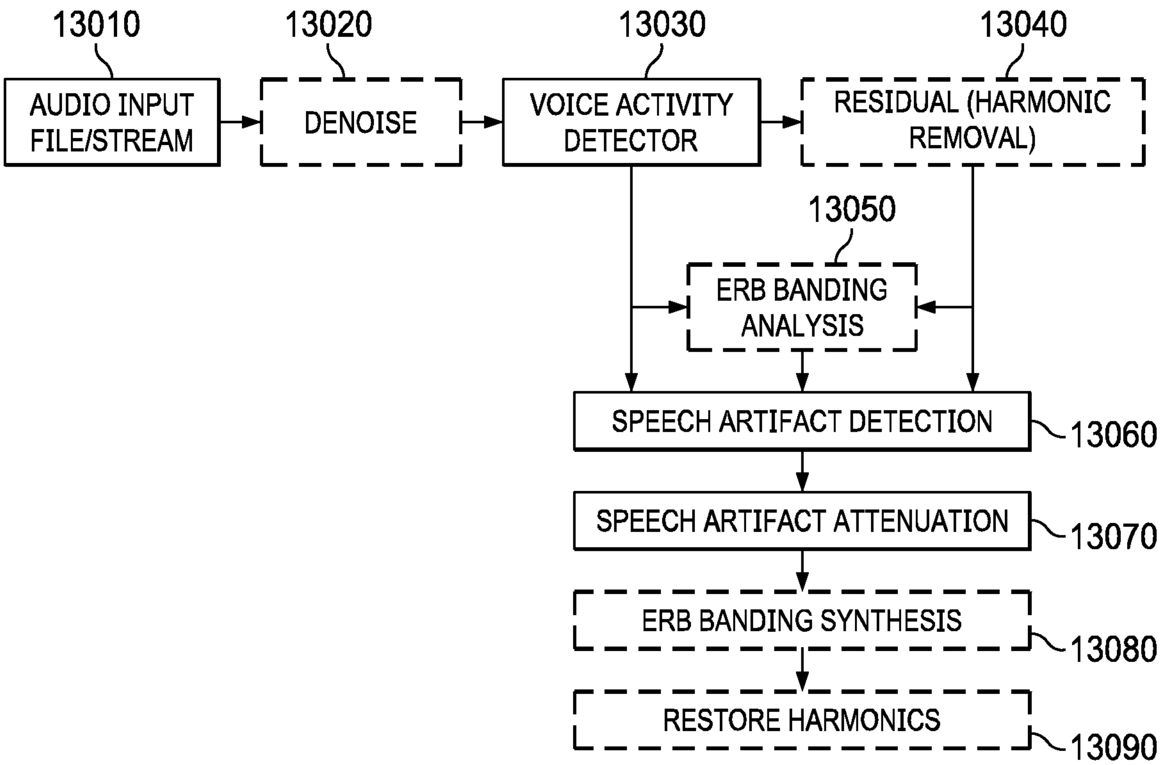
FIG. 13 is a schematic block diagram illustrating yet another example of a functional overview of techniques according to embodiments of the present disclosure.

In some possible implementations, when the residual estimation (harmonic components removed) is available (e.g., as exemplified in block 13040 of FIG. 13), it is possible to apply the envelope attenuation to the residual signal and then add back the harmonic components as the processed output (e.g., as exemplified in block 13090 of FIG. 13).

In some possible implementations, for the correction of speech clicks, it may also be possible to use other algorithms, such as autoregressive modeling or granular-based approaches similar to pitch-synchronous waveform modeling. In particular, given the click event position, it may be possible to estimate the local period to the left and to the right. By means of comparing the neighboring periods, the "waveform slice" matching the relative click position within the period may be used to replace the click with simple crossfade. To select the left or the right period for the correction, it may be possible to simply choose the one of the smaller waveform differences. In case that there would be consecutive clicks, the above-mentioned methods may sometimes be less effective and a more generative approach may then become a better option.

Figure 5:
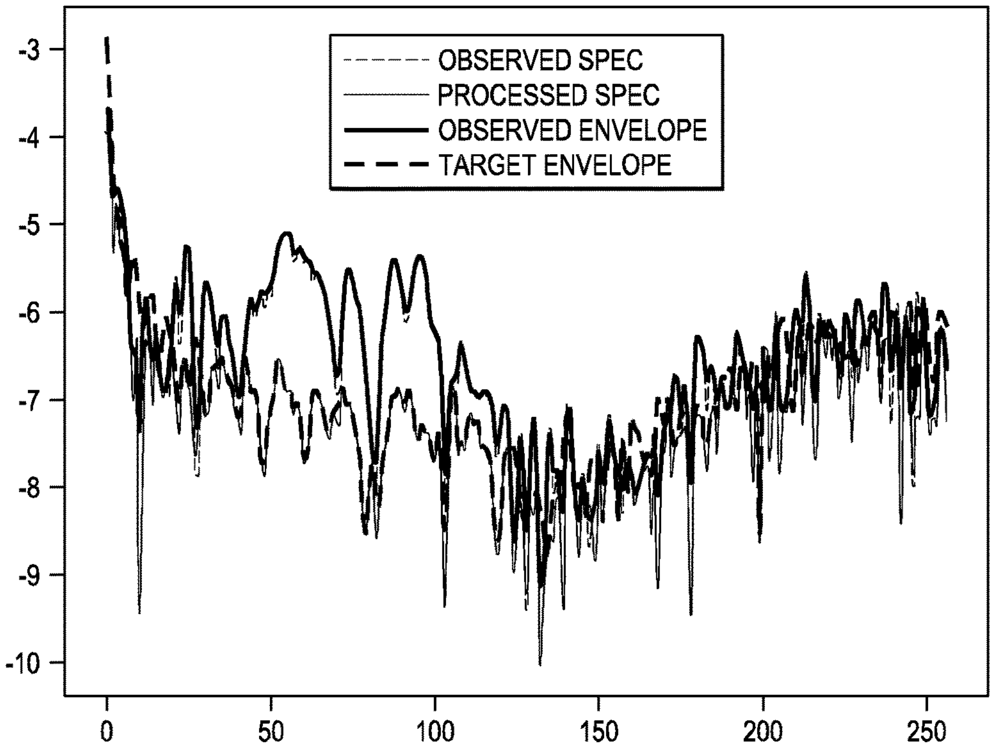
FIG. 5 is a schematic illustration of a diagram showing an example of spectral attenuation according to an embodiment of the present disclosure.

FIG. 5 is a schematic illustration of a diagram showing an example of spectral attenuation according to an embodiment of the present disclosure, wherein the observed spectral waveform, the processed spectral waveform, the observed envelope and the target envelope are illustratively shown, respectively. As can be seen from the example of FIG. 5, spectral regions of the (detected) clicks are attenuated. For the sake of completeness, it is nevertheless to be noted that, even though the example as currently shown in FIG. 5 may relate to "declick", an analogous or similar attenuation concept could also be applied to the "deplosive" scenarios. This may involve, in some implementations, smoothing the envelopes of the residual spectrum, for example, as will be appreciated by the skilled person.

Second, methods relating to "de-plosive" according to embodiments of the present disclosure will be discussed.

Similar to the above, in a broad sense, also the methods for automatic detection and adaptive attenuation of speech plosives described in the present disclosure mainly include two key aspects. That is, as a first aspect, a feature of a zero-crossing maximum (ZCM) measure is used. Compared to the measure of zero-crossing rate (ZCR), the ZCM may be seen to simply take the maximal zero-crossing length. Therefore, the ZCM may be generally considered to be robust against the noisy crossing information, especially when used in an average manner as in the case of ZCR. In addition, as a second aspect, precise detection of the plosive event boundaries may be performed based on the low frequency energy (LFE) and ZCM. In particular, the outliers from the observed low frequency energy distribution (e.g., for all the short-time frames across a file or recording) may be selected as the possible (annoying) plosive events, and then the ZCM could be used to refine the event time positions/boundaries. Finally, the attenuation of plosives may generally be performed based on high-pass filtering in either the time domain or the spectral domain with the filter order adaptive to LFE and the filter frequency adaptive to ZCM of a detected plosive.

Figure 9:
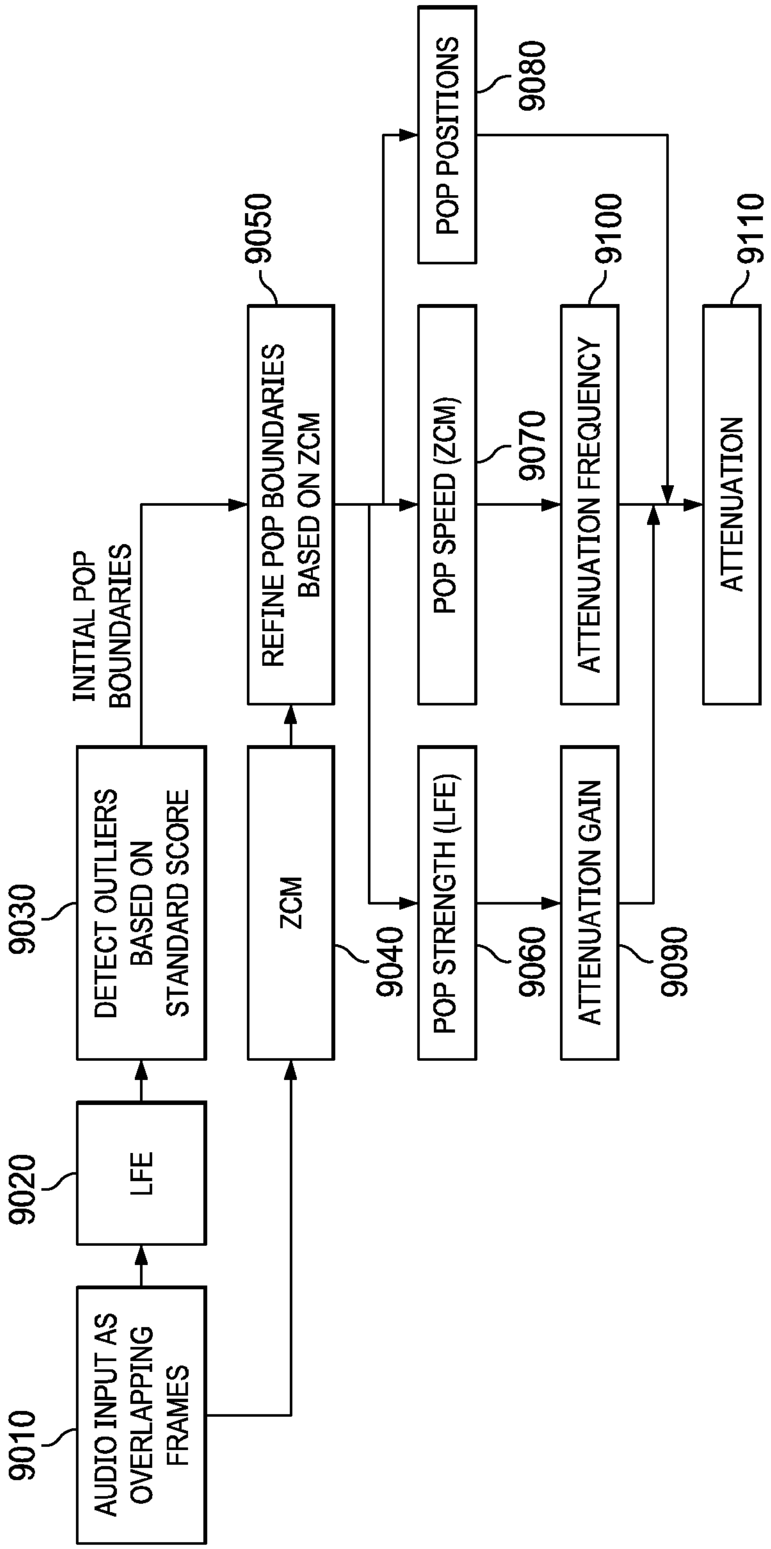
FIG. 9 is a schematic block diagram illustrating an example of a functional overview of techniques according to embodiments of the present disclosure.
Figure 10:
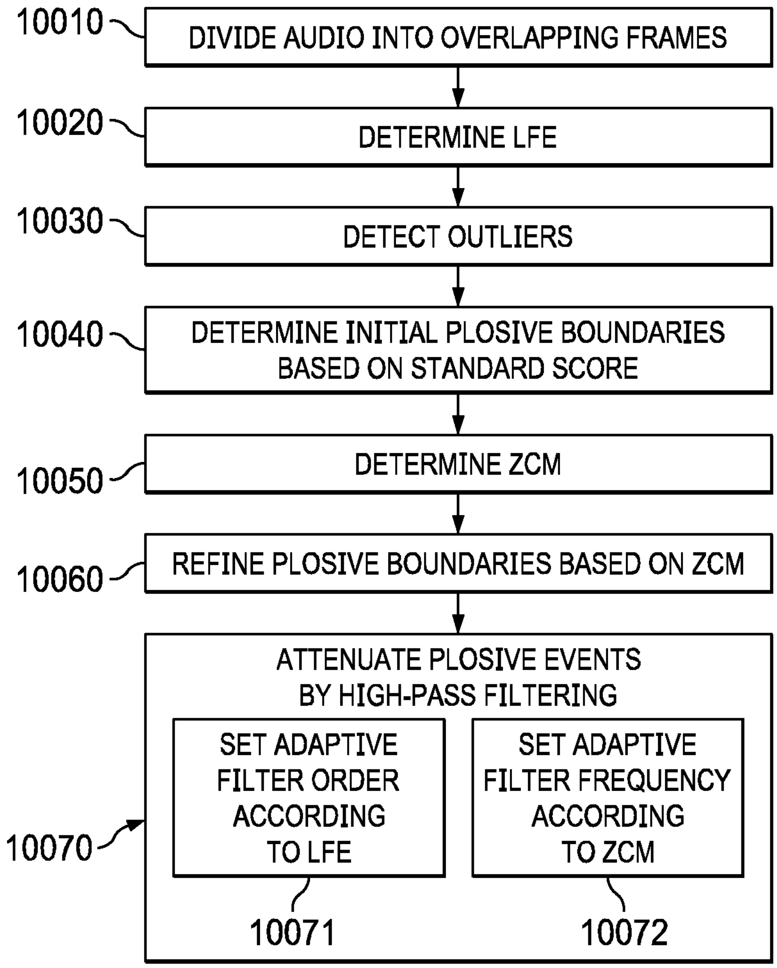
FIG. 10 is a schematic block diagram illustrating another example of a functional overview of techniques according to embodiments of the present disclosure.

Now the "de-plosive" methods will be discussed in more detail with reference to FIG. 9 and/or FIG. 10, which respectively provide a schematic functional overview of (de-plosive) techniques according to embodiments of the present disclosure. In a broad sense, FIG. 9 may be seen as a more general example while FIG. 10 may be seen as a more detailed example of a specific possible implementation. Therefore, the examples shown in FIGS. 9 and 10 may exhibit some extent of similarities (e.g., in some blocks) and differences (e.g., in some other blocks) at the same time, as will be understood and appreciated by the skilled person.

To be more specific, as shown in block 9010 or 10010, an input audio signal is provided and may be segmented/divided into a number of (short-time) overlapping audio frames (e.g., with equal frame size). This may be achieved in any suitable manner, as will be understood and appreciated by the skilled person. For instance, in some possible implementations, this segmentation of audio frames may be achieved by carrying out a short-time frame analysis using a hamming window. Particularly, in some possible implementations, the frame size may be set to be sufficiently large to allow for extracting a reliable value of zero-crossing maximum. Similarly, the overlap size may be set to be sufficiently large to track the short-time features with fine time resolution.

Subsequently, two short-time features (or sometimes also referred to as feature parameters) may be calculated (obtained), namely: the low frequency energy (LFE) as exemplified in block 9020 or 10020 and the zero crossing maximum (ZCM) as exemplified in block 9040 or 10050.

The LFE can be calculated either in time domain or in the spectral domain, and by using any suitable means. In some possible implementations, for the time domain case, the LFE may be calculated as the root mean square (RMS) energy of the lowpass filtered signal. In some possible implementations, the lowpass filter could be a 4th-order Butterworth filter with a pre-defined cut-off frequency at, for example, 80 Hz. On the other hand, in some other implementations, for the spectral domain case, LFE may be calculated from the spectrum as the RMS energy below the cut-off frequency.

As mentioned above, the ZCM is generally the length of the maximum interval of consecutive zero crossings within the short-time frame, possibly further normalized by the window size. Notably, the technique proposed in the present disclosure generally does not rely on the ZCR, which is typically used in plosive detection mechanisms.

Since the low frequency sudden pops are generally of main concern, the detection of plosive may be started by identifying the outliers of the observed LFE distribution (block 9030 or 10030). In some possible implementations, the outliers may be identified based on the concept/principle of the standard score:

$$z = \frac{x - \mu}{\sigma} \qquad (4)$$

where x is the LFE sample value, μ is the mean thereof, and a represents the standard deviation.

If there exist any outlier, they may be passed to the next threshold detection stage. Otherwise, it may be assumed that there are no potentially (annoying) plosives that necessitate further processing. In a non-limiting example, an outlier may be indicated by $z>1$ (or any other suitable value).

In some possible implementations, an adaptive threshold $th_{LFE}$ may be used for the detected outliers to select the dominant components according to:

$$th_{LFE}=\alpha\times(\max_{LFE}-th_Z)+th_Z \qquad (5)$$

where $\max_{LFE}$ is the maximum LFE, and $$th_Z=\mu+z_0\times\sigma \qquad (6)$$

Notably, here the $th_Z$ is adapted to be above the mean by a predefined factor $z_0$ of standard deviation. The multiplication factor α in equation (5) can be set to adjust detection sensitivity. In some possible implementations, the multiplication factor α may be set according to a global de-plosive amount parameter in accordance with:

$$\alpha=1-\text{amount, where } 0\leq\text{amount}\leq1$$

In case of online (real-time) processing where low latency would be required, the above statistical threshold might not be reliably estimated. Thus, in some cases, it may also be possible to use the LFE ratio instead for the current frame n according to:

$$R[n] = \frac{LFE[n]}{LFE[n-1]} \text{ if } LFE[n-1] > 0 \qquad (8)$$

Otherwise, the ratio may be computed with respect to the previously valid LFE.

The detection function may then be expressed as $R>1+f(\alpha)$, where $f(\alpha)$ is a customizable mapping function. Accordingly, the detection function could also be simply written as $R>1+\alpha$.

In some possible implementations, the frames exceeding a detection threshold may be used to define the signal regions considered as plosive events to be attenuated, which also implicitly defines the (initial) time positions where a plosive event starts and/or ends (block 9030 or 10040). However, the event boundaries may need further refinement (block 9050 or 10060), typically because the actual plosive might start and/or end with very low energy. Therefore, in some possible implementations, the ZCM measure (block 9040 or 10050) may be used for extending the boundaries to the frames where ZCM<0.1 (or any other suitable value), for instance.

Further, similar to the "de-click" scenarios, in some cases where two plosive events may overlap or be very close, they may be merged as one single plosive event (e.g., for further "de-plosive" processing).

Figure 7:
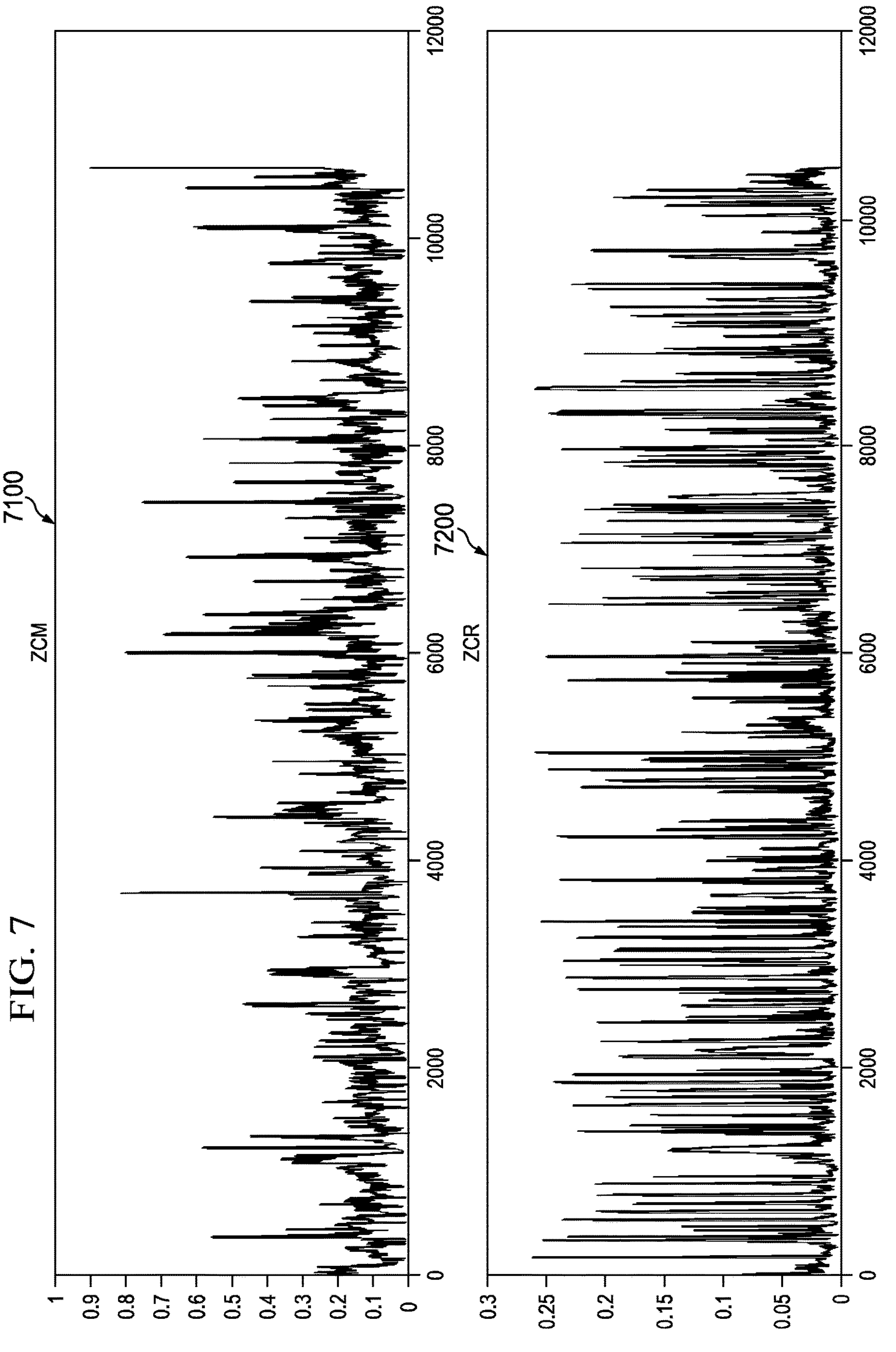
FIG. 7 is a schematic illustration of a diagram showing an example comparison between zero crossing maximum (ZCM) and zero-crossing rate (ZCR)

FIG. 7 schematically illustrates an example of comparison between the ZCM and ZCR. In particular, as can be seen from the example of FIG. 7, the ZCM diagram 7100 is generally less noisy than the ZCR diagram 7200, and therefore is better suited for identification of the underlying plosive events.

After the speech plosive events and the corresponding ranges/positions/boundaries thereof (block 9080) within the audio frames have been determined, the attenuation (or correction) of these plosives (i.e., de-plosive processing) may be the next step (block 9110). In some possible specific implementations (e.g., as shown in FIG. 10), the attenuation may be performed by using high-pass filtering (e.g., as exemplified in block 10070).

In particular, similar to the "de-click" cases, the attenuation of the speech plosives may also be carried out either in the time domain or in the spectral domain.

Broadly speaking, in some possible implementations, time domain attenuation may use a Butterworth high-pass filter with adaptive order and frequency (or any other suitable means); whilst the spectral domain attenuation may use an overlap-and-add short-time Fourier Transform (STFT) with adaptive spectral slope and frequency (or any other suitable means).

Particularly, for both the time-domain and spectral-domain attenuation, the attenuation frequency (block 9100) or, in some possible implementations, the filter (cut-off) frequency $freq_C$ (e.g., as exemplified in block 10072) may be set to be adaptive to the "speed" of the plosive event (block 9070), which may be generally defined as the 1−max ($ZCM_{plosive}$), where ZCM used here is normalized between 0 and 1, and max ($ZCM_{plosive}$) is the maximum ZCM from the start frame to the end frame of the plosive event. The mapping may then be defined as:

$$freq_C=minFreq+speed\times(maxFreq-minFreq) \qquad (9)$$

In some possible implementations, the cut-off frequency $freq_C$ may be further constrained to a predefined range, for instance [minFreq=100 Hz, maxFreq=150 Hz]. Of course, any other suitable range may be adopted as well, depending on respective implementations and/or requirements.

For the time-domain attenuation, the order of the Butterworth filter may be adaptive to the strength of the plosive event (block 9060). Particularly, the plosive strength st may in some possible implementations be defined as:

$$st=g(\max(LFE_{plosive})-th_Z \qquad (10)$$

where $\max(LFE_{plosive})$ is the maximum LFE from the start frame to the end frame of the plosive event; g(x) is a customizable mapping function mainly to ensure $0\le st\le 1$, which could be achieved by simply applying a normalization factor.

Then, the attenuation gain (as exemplified in block 9090) or in some possible cases the filter order (as exemplified in block 10071) can be obtained by the mapping:

$$order=round(minOrder+st\times(maxOrder-minOrder)) \qquad (11)$$

In some possible implementations, the order may be further constrained to a predefined range, for instance [minOrder=2, maxOrder=12]. Of course, any other suitable range may be adopted as well, depending on respective implementations and/or requirements.

Furthermore, in some possible implementations, a cross-fade region of for example 10 ms may be further used to create a smooth transition from the input signal to the filtered signal.

On the other hand, for the spectral-domain attenuation case, the input short-time signal may in some possible implementations be processed with a fast Fourier transform (FFT), followed by application of the attenuation gain with adaptive cut-off frequency and slope, application of the inverse FFT, and finally application of windowing and overlap-add to produce the (attenuated) output. Of course, as will be understood and appreciated by the skilled person, any other suitable attenuation mechanism may be applied as well, depending on respective implementations.

The spectral low-cut/high-pass gain slope may also be estimated based on the plosive strength. In some possible implementations, for each plosive event, the target reduction gain may be defined as:

$$targetGain=\frac{st}{st_{mean}} \qquad (12)$$

where $st_{mean}$ is the average strength of the input signal. That is, it is generally proposed to aim at reducing the plosive strength to the average level without over-suppression.

For the case where the LFE ratio is used to represent the strength, the ratio may be expressed directly as the target gain. While expressing targetGain in dB (as a negative value for reduction) in some cases, the attenuation gain slope can be defined as:

$$slope=-targetGain_{dB}\times\beta \qquad (13)$$

which maps the target gain to the slope (dB per octave as a positive value) and β is a scaling factor to control the aggressiveness. For each frequency bin x below $x_C$ (the bin at $freq_C$), the attenuation gain in dB can then be calculated as:

$$gain_{dB}[x]=(\log_2 x-\log_2(0.5*x_C))\times slope-slope \qquad (14)$$

In some possible implementations, a noise spectrum estimation may be used to limit the gain reduction such that the attenuation does not affect the overall spectral profile in the low frequency region.

Thus, broadly speaking, the proposed method generally attenuates faster pops with higher cut-off frequency, therefore effectively adapting to the pitch of a speaker's voice. It also attenuates stronger pops with steeper cut-off frequency slope, therefore effectively adapting to weak and strong plosives.

Notably, when techniques described above are applied to content that includes music, or combinations of speech and music, the algorithm may be sensitive to low-frequency transients such as those generated by kick drums or bass. To address this concern, in some possible implementations, a content classifier (e.g., a voice/music activity detector), computing the probability p(n) that a given frame n contains speech (or not), may be used to modify the detection or attenuation parameters, thereby ensuring that music content would not be affected by the deplosive processing. In some possible implementations, the frames where $p(n)>th_p$ (where $th_p$ is a pre-defined threshold) may be removed from the pool of LFE and ZCM to ensure relevant plosive detection and attenuation. p (n) can also be used to dynamically modify the amount parameter, e.g., by multiplying it with a logistic mapping function $f(p(n))$, where for example $f(x)=1/(1+\kappa{*}e^{-x-0.5})$) is a continuous function that approaches 0 and 1 when x approaches 0 and 1, respectively. κ generally represents the steepness parameter of the mapping.

In some implementations, particularly when computational complexity is permitting, another embodiment for the frequency/spectral domain attenuation may be adopted and will now be described in more detail.

In particular, it may be proposed to first use an analysis filterbank to produce (approximately) equivalent rectangular band (ERB) spaced frequency bands over the plosive frequency region below a (predefined) frequency threshold (e.g., approximately 500 Hz), and additionally one or more bands above this frequency threshold (e.g., 500 Hz) in order to cover the remaining frequency range. At each time instant t, the energy (denoted as e(b,t)) in each of these bands b is used to control the reduction process to create a series of gains g(b,t) that is applied to each filtered signal. The result is then fed to a synthesis filterbank to create the output signal with reduced plosive energy.

More particularly, in some possible implementations, the plosive reduction gain in each band g(b,t) may be calculated by first the output of a compression curve based on the energy of the band as:

$$g_1(b,t)=C(e_{dB}(b,t) \tag{15}$$

where $$e_{dB}(b,t)=10\log_{10}(e(b,t)) \tag{16}$$

In some possible implementations, a compression curve with threshold T, knee-width W, and compression ratio R where all qualities are expressed in decibels may be described as:

$$C(e_{dB}) = \begin{cases} 0, & \text{if } e_{db} \le T - W/2 \\ -\dfrac{(1-1/R)\left[e_{db}-(T-W/2)\right]^2}{2W}, & \text{if } T-W/2 < e_{db} < T+W/2 \\ -(1-1/R)(e_{db}-T), & \text{if } e_{db} > T+W/2 \end{cases} \tag{17}$$

As will be understood and appreciated by the skilled person, any suitable values for the threshold T, knee-width W, and compression ratio R may be used. In an illustrative example, T=−65, W=10, R=6 may be used. Then, the compression curve is 0 dB at low energy and can give only attenuation as the energy increases. It is also understood that T may be adapted dynamically with the time smoothed energy envelope of speech over time.

In some possible implementations, the gains may then be further clipped to ensure that the power in each band would not be reduced below the estimated noise floor in the band (denoted as n̂(b,t) or in dB as $\widehat{n_{dB}}$ (b,t)) according to:

$$g_2(b,t)=\min(\max(g_1(b,t),\widehat{n_{dB}}(b,t)-e_{dB}(b,t)),0) \tag{18}$$

This would generally avoid audible dips in the noise when there may be a plosive in the presence of significant background noise.

One possible way to estimate the noise may be:

$$\widehat{n_{dB}}(b,t) = \min_{\tau} e_{db}(b,t+\tau),\ t1 < \tau < t2 \tag{19}$$

where a negative value of t1 means the use of the estimation history and a positive value of t2 may in some cases require some latency compensation for causality and thus could be set to 0. In some possible implementations, a good estimate may be given by −t1=t2=300 ms. In some possible implementations, it may also be useful to remove values below 80 dB from the minimum calculation, as they would generally not be representative of the noise floor during speech (and more likely be produced by a noise gate).

In some cases, a difficult case to handle may be to distinguish between the undesirable low frequency energy of plosive events, and the desirable low frequency energy in vowel sounds, when the lowest frequency is around for example 80 Hz. Depending on respective implementations, some tools may generally be used to resolve these conditions. To be more specific, in some possible implementations, a time smoothed low frequency energy estimate of the signal above noise floor, which seeks to maintain the compression gain, and a tonality measure (or in some possible implementations, a measure of (some sort of) periodicity) that detects the repeated peakiness of the vowel and reduces the gains may be used. These may be implemented as follows:

$$LFE(t) = \sum_{b=0}^{B-1}\frac{e(b,t)}{B},\ \hat{n}(t) = \sum_{b=0}^{B-1}\frac{\hat{n}(b,t)}{B} \tag{20}$$

where b=B corresponds to the band centred at e.g. 200 Hz. This estimate may be then smoothed over time with an exponential smoother with an attack time of for example 50 ms and a release time of for example 100 ms, which gives the smoothed $LFE_S$. Finally, subtracting the estimated noise floor would give:

$$LFE_n=10\log_{10}(LFE_S)-10\log_{10}(\hat{n}(t)) \tag{21}$$

This may then be further thresholded and scaled to a useful range to create the factor, for example, according to:

$$f_{lf}=(\min(\max(LFE_n,30),40)-30)/10 \tag{22}$$

In some possible implementations, tonality (or in some cases, a measure of periodicity) may be (best) estimated prior to conversion into the filterbank domain. In some possible implementations, the filterbank may calculate the FFT values of the overlapped windowed audio signals. For ease of illustration, in some possible implementations, it may be assumed that the power in the FFT bins p(k) is available and bins k=0 up to k=K will be used, where K corresponds to 500 Hz at a given sample rate, for example.

The periodicity measure (e.g., cepstrum in some possible implementations) may then be calculated on those bins as follows:

$$C_p = 10\log_{10}|\mathcal{F}\{\log(p(k))\}| \quad (23)$$

where $\mathcal{F}$ may be the forward or inverse Fourier Transform. This may be thought of as a kind of autocorrelation. Broadly speaking, it may be expected that the vowels have periodicities of the order of 100 Hz or less. Thus, in some possible implementations, it may be possible to consider the first 100 Hz of $C_p$ and to find the minimum $C_p$ (min), and the maximum that occurs after this minimum in the first 100 Hz $C_p$(max). In some possible implementations, this is then clipped and scaled to a tonality measure:

$$\text{tonality} = (\min(\max(C_p(\max) - C_p(\min), 0), 6))/6 \quad (24)$$

In some possible implementations, the tonality measure might instead be calculated by searching for the largest spectral peak in p(k) in for example the frequency range 60 Hz to 250 Hz, and requiring the peak to be a reasonable sinusoidal peak (the main lobe should be narrow and deep enough). For example, the tonality measure may scale from 0 to 1 (e.g., linearly) as the depth at peak center plus or minus 60 Hz ranges from 5 to 15 dB.

This value may also be smoothed over time for example with 75 ms attack and 300 ms release time giving the smoothed tonality.

This (smoothed) tonality measure and also the above calculated $f_{lf}$ may be further combined into a gain scale factor:

$$g_3 = g_2 \times f_{lf} + (1 - f_{lf}) \times (1 - \text{tonality}_s)^2 \quad (25)$$

It is noted that the above-illustrated periodicity/tonality measure may also be referred to as a "speech harmonic protection measure" in the context of the present disclosure. Further, periodicity and tonality measures may be used interchangeably.

The gains may then be further constrained so that for bands above a certain (pre-determined) threshold, e.g., 70 Hz, the gain cannot be attenuated more than the band immediately lower in frequency, in accordance with:

$$g_4(b,t) = \max(g_3(b,t), g_3(b-1,t)) \quad (26)$$

where b has a band center frequency above e.g., 70 Hz.

Broadly speaking, the above proposed method generally enforces the reduction to follow the physical reduction of plosive energy with increasing frequency. Particularly, when a lower band is significantly reduced in energy, if the next higher band has more energy it is more likely to be genuine speech energy rather than plosive related energy. Generally speaking, in some possible implementations, the very lowest bands (below e.g., 70 Hz) may not follow this trend, for example, excess 60 Hz mains hum may make one band louder, or a DC blocking filter may attenuate the lowest bands, and this should not restrict attenuation of plosive energy.

Finally, in some possible implementations, these gains $g_4$(b,t) may be further smoothed over time with for example attack times of 20 ms and release time of 50 ms to produce the final gains g(b,t) that will be applied to the filtered signal (e.g., subband signal). In some implementations, the final gains may be applied in band-wise manner, for example.

Figure 8:
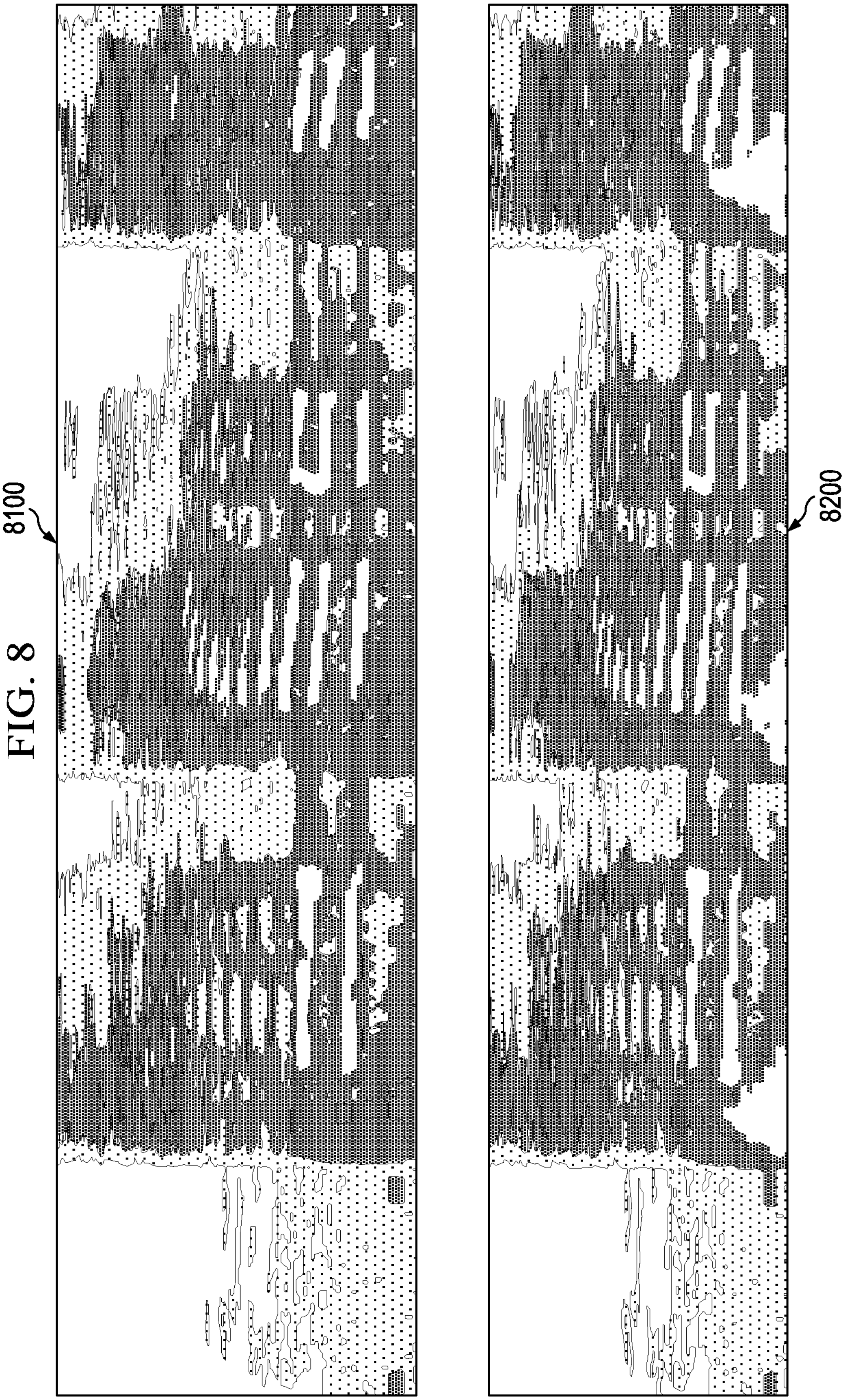
FIG. 8 is a schematic illustration of a diagram showing an example of attenuation of speech plosives according to embodiments of the present disclosure.

FIG. 8 is a schematic illustration of a diagram showing an example of attenuation of speech plosives according to an embodiment of the present disclosure. In particularly, as can be seen from FIG. 8, the speech plosive events (cf. the white regions in the low frequency parts of diagram 8200) have been effectively attenuated in the corresponding attenuated diagram 8100.

Figure 11:
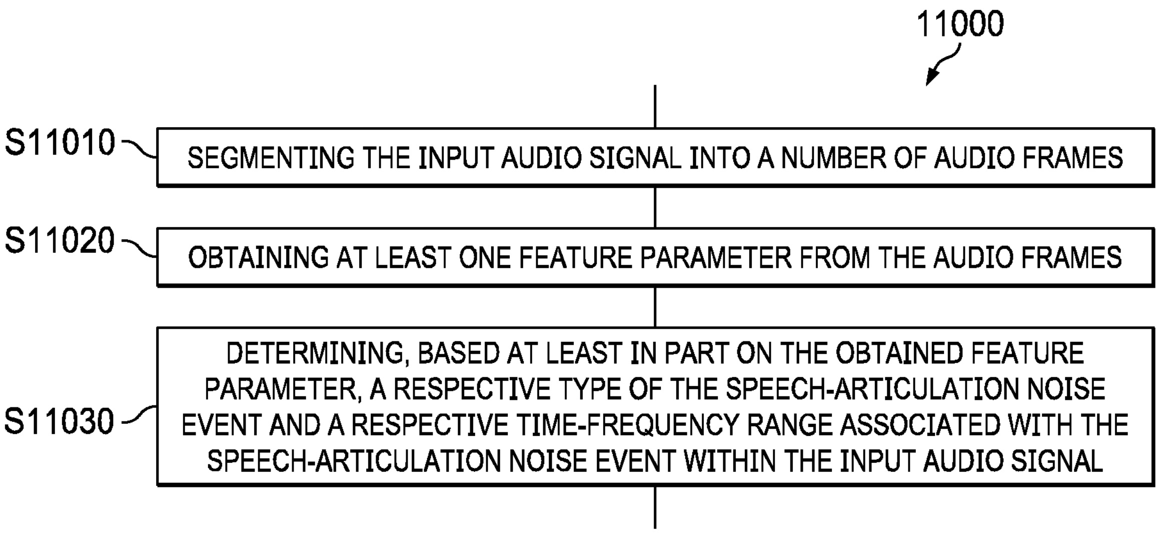
FIG. 11 is a schematic flowchart illustrating an example of a method according to an embodiment of the disclosure.

FIG. 11 is a schematic flowchart illustrating an example of a method 11000 of performing automatic audio enhancement on an input audio signal including at least one speech-articulation noise event according to an embodiment of the disclosure.

In particular, the method 11000 described herein may be applied to perform automatic audio enhancement (e.g., detection, attenuation, etc.) either for speech plosive noise events or mouth click noise events.

More particularly, the method 11000 may start with step S11010 by segmenting (e.g., by using one or more suitable windows) the input audio signal into a number of audio frames (e.g., of size of 100 ms). The method 11000 may then continue with step S11020 by obtaining (e.g., determining, calculating, extracting, etc.) at least one feature parameter from the (segmented) audio frames. In some possible example implementations, the feature parameter so obtained may be considered to be associated with a type of the (to-be-detected) speech-articulation noise event. That is to say, in some possible example implementations, depending on the type of the (to-be-detected) speech-articulation noise event, different feature parameters will have to be obtained from the audio frames. Finally, the method 11000 may continue with step S11030 by determining (e.g., detecting, calculating, etc.), based at least in part on the obtained feature parameter, a respective type of the speech-articulation noise event and a respective range (e.g., time and/or frequency range) associated with the speech-articulation noise event within the input audio signal.

Configured as described above, broadly speaking, the proposed method 11000 provides an efficient and flexible mechanism for determining (detecting) possible/potential speech-articulation noise event(s) (e.g., artifacts) comprised within the input audio signal. Thereby, appropriate further enhancement (post-)processing (e.g., attenuation) may be facilitated. As a result, manual editing/processing previously required for identifying and attenuating the noise event(s) in the audio signal can be largely avoided. At the same time, listening experience can be greatly improved.

Figure 12:
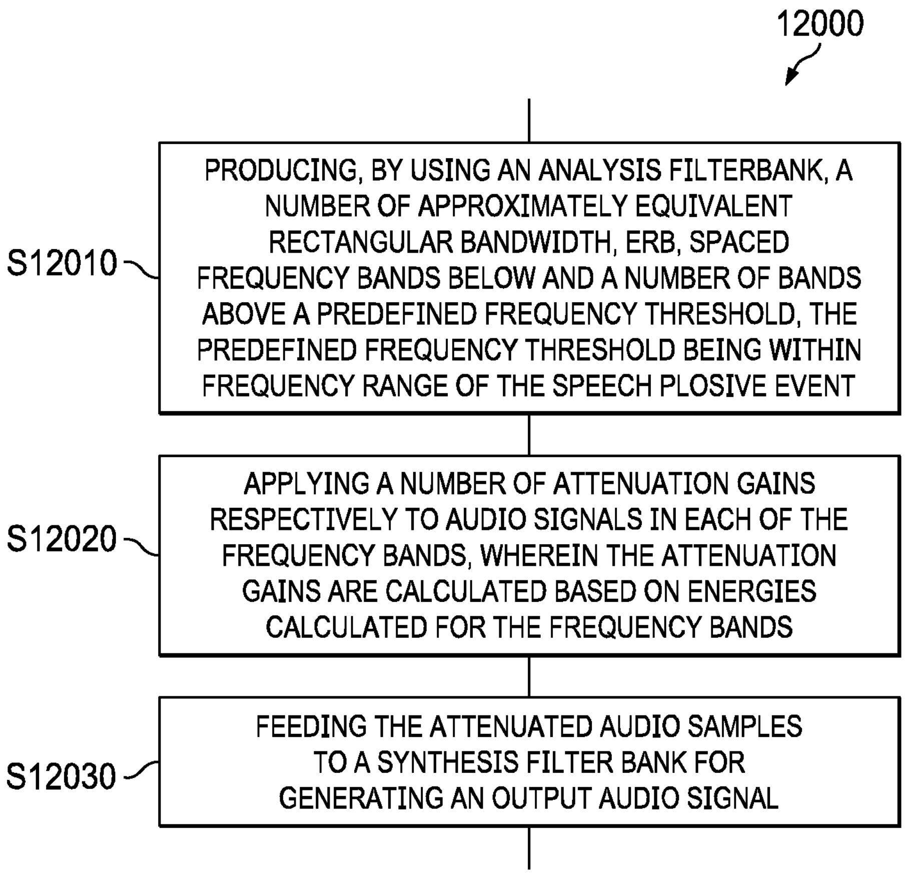
FIG. 12 is a schematic flowchart illustrating an example of a method according to another embodiment of the disclosure.

FIG. 12 is a schematic flowchart illustrating an example of a method 12000 of performing automatic audio enhancement on an input audio signal for detecting and/or attenuating at least one speech-articulation noise event contained therein according to another embodiment of the disclosure. The speech-articulation noise event may comprise, among others, at least one speech plosive event. Thus, it may be considered that the method 12000 described herein could be specifically suitable for performing automatic audio enhancement (e.g., detection, attenuation, etc.) for speech plosive noise events.

Particularly, the method 12000 may start with step S12010 by producing, by using an analysis filterbank, a number of approximately equivalent rectangular bandwidth (ERB) spaced frequency bands below and a number of bands above a predefined frequency threshold, the predefined frequency threshold being within frequency range of the speech plosive event. The method 12000 may then continue with step S12020 by applying a number of attenuation gains respectively to audio signals in each of the frequency bands, wherein the attenuation gains are calculated based on energies calculated for the frequency bands. Finally, the method 12000 may yet further continue with step S12030 by feeding the attenuated audio samples to a synthesis filter bank for generating an output audio signal.

Configured as described above, broadly speaking, the proposed method 12000 provides an efficient and flexible mechanism for determining (detecting) and attenuating possible/potential speech-articulation noise event(s) (e.g., speech plosive events) comprised within the input audio signal. Thereby, manual editing/processing previously required for identifying and attenuating the noise (e.g., plosive) event(s) in the audio signal can be largely avoided. At the same time, the listening experience can be greatly improved.

Incidentally, it is to be noted that although the methods/techniques for the declick and deplosive processing seem to be illustrated separately, the skilled person would understand and appreciate that at least some of the techniques illustrated above may be used interchangeably.

As illustrative non-limiting examples, in some possible implementations, the filterbank approach (which is described above in the context of deplosive processing) can also be applied to declick, where the spectral envelopes may be defined by the ERB band energy and a similar multi-band compression (compressor ratio determined by the target attenuation gain, with respective attack/release time) scheme may be applied. It may be noticed that the effective ERB bands may spread up to the Nyquist limit for the declick techniques but they are limited to low-frequency (e.g., 500 Hz) for the deplosive process. Further, it may be possible to make use of "residuals" (which are described above only for the declick processing) also for the deplosive processing, as an alternative to the periodicity measure based on the cepstrum. It may be noticed that the residual for deplosive processing cannot use the second-order sample difference but has to use some other suitable estimation.

FIG. 13 illustratively shows an example aiming at combining techniques for both declick processing and also deplosive processing in a (single) functional overview.

Figure 6:
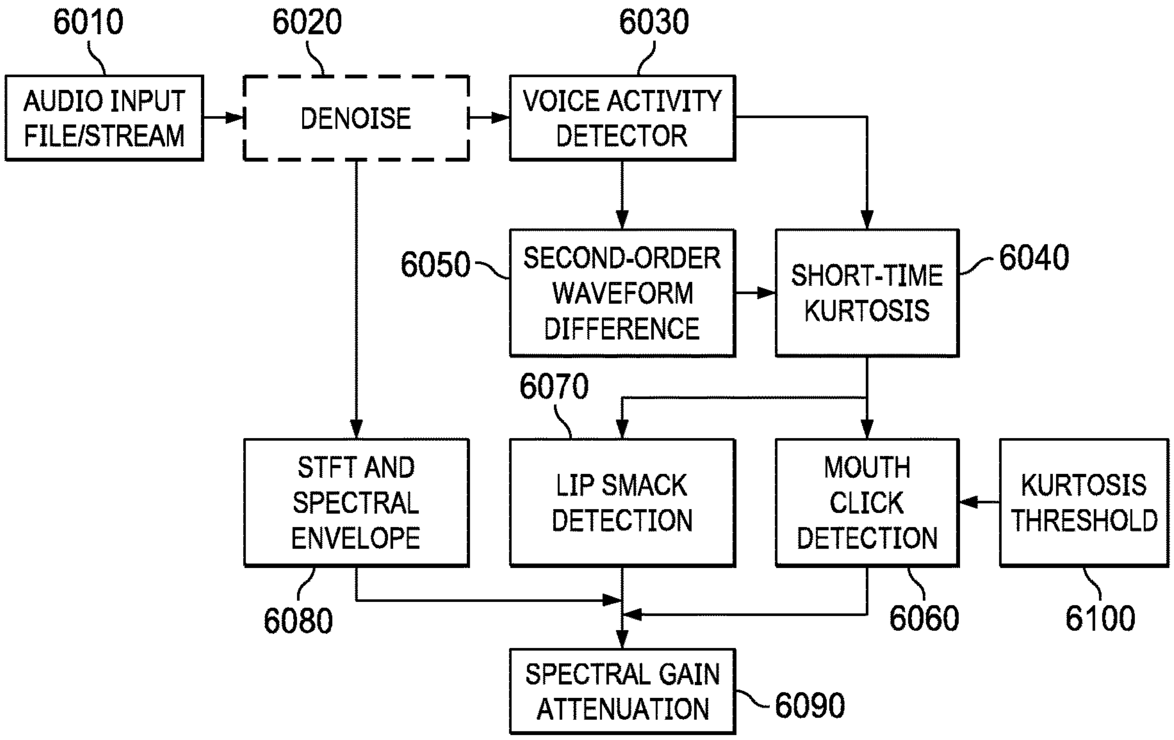
FIG. 6 is a schematic block diagram illustrating an example of a functional overview of techniques according to embodiments of the present disclosure.

Particularly, it is noted that functional blocks 13010, 13020 and 13030 in FIG. 13 are generally analogous or similar to functional blocks 6010, 6020 and 6030 in FIG. 6, so that repeated description thereof may be omitted for the sake of conciseness. It is further to be noted that dashed blocks shown in FIG. 13 may generally mean that respective function steps could be optional, as will be described in more detail below.

As noted above, for deplosive processing, an ERB banding analysis (dashed block 13050) may be applied for detecting the corresponding speech artefact, in the present case the speech plosive events (as exemplified in block 13060) and subsequently attenuating such speech artefact (block 13070). On the other hand, for the declick scenarios, the ERB-related procedure (or in some cases also referred to as filterbank approach) may be performed after the speech artefact, in the present case the mouth click events, have been detected (block 13060). In such cases, such ERB-related procedure may also be referred to as ERB banding synthesis (as exemplified in the dashed block 13080) that is used for attenuating the detected mouth clicks (block 13070). As illustrated above, when the filterbank approach (which is described above in the context of deplosive processing) is to be applied to declick, the spectral envelopes may be defined by the ERB band energy and a similar multi-band compression (compressor ratio determined by the target attenuation gain, with respective attack/release time, or envelope interpolation) scheme may be applied. As will be understood and appreciated by the skilled person, any other or further suitable process may be adopted, depending on various implementations and/or requirements.

Moreover, as described above and also shown in FIG. 13, the techniques described herein may further (optionally) make use of the "residuals" (e.g., by removing speech harmonic components, as exemplified in dashed block 13040) for both the declick processing and also the deplosive processing (where it is used as an alternative to the periodicity/tonality measure). It is nevertheless to be noted that, in such cases (i.e., where residual is used), the harmonics may have to be restored or added back eventually (as exemplified in the dashed/optional block 13090), for instance after the envelope attenuation has been applied to the residual signal.

Figure 14:
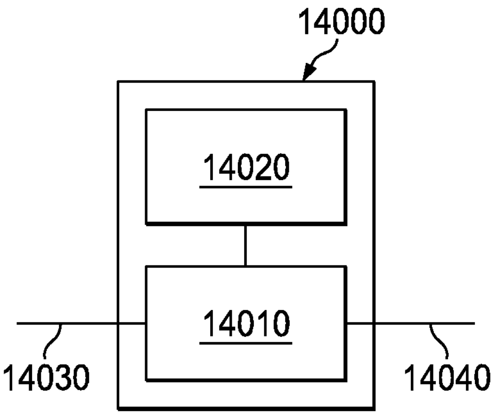
FIG. 14 is a block diagram of an apparatus for performing methods according to embodiments of the disclosure.

The present disclosure likewise relates to apparatus for performing methods and techniques described throughout the disclosure. FIG. 14 shows an example of such apparatus 14000. Said apparatus 14000 comprises a processor 14010 and a memory 14020 coupled to the processor 14010. The memory 14020 may store instructions for the processor 14010. The processor 14010 may receive audio data 14030 as input. The audio data 14030 may have the properties described above in the context of respective methods of performing automatic audio enhancement on an input audio signal for detecting and/or attenuating at least one speech-articulation noise event contained therein. The processor 14010 may be adapted to carry out the methods/techniques described throughout this disclosure. Accordingly, the processor 14010 may output denoised (e.g., declicked, deplosived) audio data 14040. In some further possible implementations, the processor 14010 may also be enabled to receive further input (e.g., control parameters, not shown in FIG. 14), for example for controlling the audio enhancement processing behavior.

Interpretation

A computing device implementing the techniques described above can have the following example architecture. Other architectures are possible, including architectures with more or fewer components. In some implementations, the example architecture includes one or more processors (e.g., dual-core Intel® Xeon® Processors), one or more output devices (e.g., LCD), one or more network interfaces, one or more input devices (e.g., mouse, keyboard, touch-sensitive display) and one or more computer-readable mediums (e.g., RAM, ROM, SDRAM, hard disk, optical disk, flash memory, etc.). These components can exchange communications and data over one or more communication channels (e.g., buses), which can utilize various hardware and software for facilitating the transfer of data and control signals between components.

The term "computer-readable medium" refers to a medium that participates in providing instructions to processor for execution, including without limitation, non-volatile media (e.g., optical or magnetic disks), volatile media (e.g., memory) and transmission media. Transmission media includes, without limitation, coaxial cables, copper wire and fiber optics.

Computer-readable medium can further include operating system (e.g., a Linux® operating system), network communication module, audio interface manager, audio processing manager and live content distributor. Operating system can be multi-user, multiprocessing, multitasking, multithreading, real time, etc. Operating system performs basic tasks, including but not limited to: recognizing input from and providing output to network interfaces and/or devices; keeping track and managing files and directories on computer-readable mediums (e.g., memory or a storage device); controlling peripheral devices; and managing traffic on the one or more communication channels. Network communications module includes various components for establishing and maintaining network connections (e.g., software for implementing communication protocols, such as TCP/IP, HTTP, etc.).

Architecture can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Unless specifically stated otherwise, as apparent from the following discussions, it is appreciated that throughout the disclosure discussions utilizing terms such as “processing”, “computing”, “calculating”, “determining”, “analyzing” or the like, refer to the action and/or processes of a computer or computing system, or similar electronic computing devices, that manipulate and/or transform data represented as physical, such as electronic, quantities into other data similarly represented as physical quantities.

Reference throughout this disclosure to “one example embodiment”, “some example embodiments” or “an example embodiment” means that a particular feature, structure or characteristic described in connection with the example embodiment is included in at least one example embodiment of the present disclosure. Thus, appearances of the phrases “in one example embodiment”, “in some example embodiments” or “in an example embodiment” in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted", "connected", "supported", and "coupled" and variations thereof are used broadly and encompass both direct and indirect mountings, connections, supports, and couplings.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects and implementations of the present disclosure may also be appreciated from the following enumerated example embodiments (EEEs), which are not claims.

EEE 1. A method for detecting and attenuating mouth clicks in recordings of speech content, based on:
- a. dividing the audio into speech frames and non-speech frames;
- b. calculating the 2nd-order waveform difference for speech frames;
- c. detecting mouth clicks based on the kurtosis of each short-time waveform;
- d. calculating the target spectral gain based on the interpolation of spectral envelopes between the start and the end of a click; and
- e. applying gains to each frame and perform overlap-add re-synthesis.

EEE 2. The method of EEE 1, where the identification of speech and non-speech frames is given by an existing VAD (voice activity detector).

EEE 3. The method of EEE 1, where an optional denoising could be applied to the input signal to better reveal the underlying mouth clicks.

EEE 4. The method of EEE 1a, where two window sizes are used respectively to detect speech clicks (short) and non-speech clicks (long).

EEES. The method of EEE 1c, where the kurtosis for the original waveform $k_W$ and the kurtosis for the $2^{nd}$-order waveform difference are calculated for mouth click detection.

EEE 6. The method of EEE 1 c, where the mouth clicks are detected by the pre-defined kurtosis thresholds. The thresholds could be different for $k_W$ and $k_D$.

EEE 7. The method of EEE 5, where non-speech clicks are detected based on $k_W$ and speech clicks are detected based on $k_D - \alpha * k_W$ with a weighting parameter a.

EEE 8. The method of EEE 7, where the speech transients can be further excluded from the kurtosis-based detection. This needs to be taken care for speech clicks only.

EEE 9. The method of EEE 8, where the speech transients can be detected based on the Center of Gravity (mean time) of the short-time signal.

EEE 10. The method of EEE 7, where the start of a mouth click is defined when kurtosis goes above the threshold and the end of a mouth click is defined when kurtosis falls below it. Therefore, a mouth click event usually cover several consecutive short-time frames.

EEE 11. The method of EEE 7, where non-speech clicks tend to be long in duration and thus merging close non-speech clicks are preferred.

EEE 12. The method of EEE 7, where a non-speech click right before speech starts is considered lip smack candidate.

EEE 13. The method of EEE 12, where the end position of a lip smack event is extended based on the following features: spectral slope, high/low peak ratio and energy envelope.

EEE 14. The method of EEE 13, where the high/low peak ratio is defined as the amplitude ratio between the largest peak in the high-frequency band and that in the low-frequency band.

EEE 15. The method of EEE 14, where the high/low frequency band is separated by a pre-defined frequency e.g. 1.5 kHz.

EEE 16. The method of EEE 7, where speech clicks tend to be short and thus it is preferred to refine the start/end sample positions.

EEE 17. The method of EEE 16, where a simple refinement method is to locate the largest 2nd-order waveform difference (maxD) within the initial click range detected by kurtosis. A pre-defined speech click duration of, 2 ms for example, can then be used to determine the refined start/end position around maxD.

EEE 18. The method of EEE 16, where an alternative refinement method is "min/max change rate". It is the zero-crossing rate of a converted waveform (cZCR) which is −1/+1 at local minima/maxima and 0 elsewhere. The frames with cZCR above the threshold define the refined positions.

EEE 19. The method of EEE 1d, where the spectral gain attenuation is calculated based on the observed spectral envelope and the target spectral envelope. Inherited by the spectral envelope, the spectral gain defines the frequency-dependent gain values at each spectral bin.

EEE 20. The method of EEE 19, where the target spectral envelope can be estimated by the linear interpolation of spectral envelopes between the two "clean" frames (not-containing any click events) at each ends of a click event.

EEE 21. The method of EEE 19, where the spectral gain at each short-time frame is defined as the target envelope divided by the observed envelope.

EEE 22. The method of EEE 19, where the spectral gain is limited for attenuation only. The resulting amplification gain is forced to be set as 1.

EEE 23. The method of EEE 19, where the spectral gain for speech frames applies to the spectral region above a pre-defined voiced frequency, 4 kHz for example.

EEE 24. A method for detecting and attenuating undesired plosives sound events in recordings of speech content, based on:

a. dividing the audio into overlapping frames;
b. analyzing the low-frequency energy (LFE) and zero-crossing maximum (ZCM) of each frame;
c. detecting plosive events with precise start/end time positions; and
d. attenuating the plosive by means of high-pass filtering with adaptive order and cut-off frequency.

EEE 25. The method of EEE 24b, where LFE can be calculated in the time domain or in the spectral domain with a pre-defined cut-off frequency.

EEE 26. The method of EEE 25, where the time-domain LFE can be calculated as the RMS energy of the lowpass filtered version of the input signal.

EEE 27. The method of EEE 25, where the spectral-domain LFE can be calculated as the RMS energy of a short-time spectrum below the cut-off frequency.

EEE 28. The method of EEE 24b, where ZCM is the maximum interval of consecutive zero crossings, normalized by the window size.

EEE 29. The method of EEE 24a, where the frame size is set sufficiently large to extract a reliable value of zero-crossing maximum. The overlap size is set sufficiently large to track the short-time features with fine time resolution.

EEE 30. The method of EEE 24c, where the plosive detection is based on selecting the outliers of LFE distribution across all the short-time frames of a file.

EEE 31. The method of EEE 30, where the outliers are detected by the standard score and an adaptive threshold is used to select the dominant ones.

EEE 32. The method of EEE 31, where the threshold is adaptive to the difference between the maximum LFE and the standard score threshold, multiplied by a scaling factor.

EEE 33. The method of EEE 32, where the scaling factor can be derived from a global plosive removal amount control [0,1].

EEE 34. The method of EEE 24c, where the plosive detection for the low-latency use case is based on the LFE ratio between the two neighboring frames.

EEE 35. The method of EEE 34, a pre-defined threshold is used for the detection, which can be defined as 1 plus the detection sensitivity.

EEE 36. The method of EEE 32 or EEE 34, where consecutive frames that exceed the threshold define the time span of a plosive sound event.

EEE 37. The method of EEE 24c, where the initial plosive event boundaries are defined by the method of EEE 36.

EEE 38. The method of EEE 36, where the initial event boundaries are further refined based on ZCM.

EEE 39. The method of EEE 38, where the start and end positions are extended till the ZCM falls below a predefined threshold.

EEE 40. The method of EEE 24d, where the attenuation process can be carried out in the time domain or the spectral domain.

EEE 41. The method of EEE 40, where the filter frequency is adaptive to ZCM with the frequency constraint of a predefined range.

EEE 42. The method of EEE 40, where the time-domain attenuation uses a Butterworth filter of which the filter order is adaptive to the strength of low frequency energy with the order constraint of a predefined range.

EEE 43. The method of EEE 42, where the filtered output crossfades with the original input signal at the event boundaries with a predefined transition duration.

EEE 44. The method of EEE 40, where the spectral-domain attenuation uses a standard STFT overlap-and-add framework.

EEE 45. The method of EEE 44, where the spectral attenuation gain slope is adaptive to the strength of low frequency energy.

EEE 46. The method of EEE 45, where the gain slope is expressed as dB per octave below the cutoff frequency.

EEE 47. The method of EEE 44, where the attenuation gain can be limited by the estimated noise spectrum to prevent over-suppression.

EEE 48. The method of EEE 32, where the scaling factor can incorporate the probability of speech obtained from a content classifier. The resulting factor weights accordingly the detection threshold to avoid processing of non-voice frames.

EEE 49. A method for detecting and attenuating mouth clicks in audio data, comprising:

receiving a plurality of audio frames representing audio data;

calculating one or more short-time waveforms based on the plurality of audio frames;

detecting one or more mouth clicks based on the kurtosis of the one or more short-time waveforms;

calculating a set of target spectral gains based at least in part on an interpolation of spectral envelopes between a start and an end of the one or more detected mouth clicks; and attenuating the one or more mouth clicks by applying the set of target spectral gains to the plurality of audio frames and performing overlap-add re-synthesis EEE 50. The method of EEE 49, furthering comprises:

classifying each of the plurality of audio frames as speech frames or non-speech frames; and wherein:

calculating one or more short-time waveforms based on the plurality of audio frames includes:

calculating an original waveform derived from the audio content; and calculating a $2^{nd}$-order waveform difference for the speech frames;

detecting one or more mouth clicks comprises:

detecting one or more mouth clicks for the non-speech frames using the original waveform derived from the audio content; and detecting one or more mouth clicks for the speech frames using the 2nd-order waveform difference for the speech frames.

EEE 51. The method of EEE 49 or 50, further comprising: denoising the audio frames prior to calculating the one or more short-time waveforms.

EEE 52. The method of any of EEEs 50-51, wherein classifying each of the plurality of audio frames as speech frames or non-speech frames is performed by an existing voice activity detector.

EEE 53. The method of any of EEEs 49-52, wherein the one or more mouth clicks for speech frames are detected in accordance with a first pre-defined kurtosis threshold ($K_{T1}$).

EEE 54. The method of EEE 53, wherein the one or more mouth clicks for speech frames are detected in accordance with a second pre-defined kurtosis threshold ($K_{T2}$) different than the first pre-defined kurtosis threshold.

EEE 55. The method of any of EEEs 49-54, wherein speech transients are detected and excluded from the kurtosis-based mouth click detection.

EEE 56. The method of EEE 55, wherein the speech transients are detected based at least in part on the Center of Gravity (mean time) of the original waveform derived from the audio content (e.g., a short-time signal based on the audio content).

EEE 57. The method of any of EEEs 49-56, wherein a start of a respective mouth click is defined when kurtosis goes above $K_T$ and the end of a respective mouth click is defined when kurtosis falls below $K_T$.

EEE 58. The method of any of EEEs 50-57, wherein detecting one or more mouth clicks for non-speech frames includes merging non-speech clicks separated by less than a first duration.

EEE 59. The method of any of EEEs 50-58, wherein detecting one or more mouth clicks for the speech frames further comprises: refining start and end positions for each respective mouth click of the one or more mouth clicks for the speech frames.

EEE 60. The method of EEE 59, wherein refining start and end positions includes:

locating the largest 2nd-order waveform difference (MD) within a rough click range detected by kurtosis for a respective mouth click; and defining a refined start position or refined stop position of the respective mouth click based on a pre-defined speech click duration.

EEE 61. The method of EEE 59, wherein refining start and end positions includes:

defining a refined start position or refined stop position of a respective mouth click based on a zero-crossing rate of a converted waveform (cZCR). (e.g., The converted waveform maps the local min/max of the observed waveform to −1/1 and maps all the other values to 0)

EEE 62. The method of EEE 48, wherein the set of target spectral gains is calculated based at least in part on an observed spectral envelope and the target spectral envelope.

EEE 63. The method of EEE 62, wherein the target spectral envelope is estimated by a linear interpolation of spectral envelopes between two "clean" frames at each end of a click event (e.g., surrounding frames not-containing any click events).

EEE 64. The method of EEE 62, wherein the set of target spectral gains at each short-time frame is defined as the target envelope divided by the observed envelope.

EEE 65. The method of EEE 64, wherein the set of target spectral gain is limited for attenuation only. (e.g., The resulting amplification gain is forced to be set as 1.)

EEE 66. The method of EEE 64, wherein the set of target spectral gains for speech frames applies to the spectral region above a pre-defined voiced frequency.

EEE 67. A method for detecting and attenuating undesired plosives sound events in audio including speech content, based on:

frames;

dividing the audio into a plurality of overlapping frames;

determining the low-frequency energy of each of the plurality of overlapping frames;

determining the zero-crossing maximum of at least one of the plurality of overlapping detecting a plurality of plosive events with precise start/end time positions;

generating output audio by attenuating the plurality of plosive events using an adaptive high-pass filter, wherein the order and cutoff frequency of the adaptive high-pass filter are adapted to each of the plurality of plosive events.

EEE 68. The method of EEE 67, wherein the low frequency energy is the RMS energy of a lowpass filtered version of the input signal.

EEE 69. The method of EEE 67, wherein zero-crossing maximum is the maximum interval of consecutive zero crossings, normalized by the window size.

EEE 70. The method of EEE 67, wherein the frame size is set sufficiently large to extract a reliable value of zero-crossing maximum. The overlap size is set sufficiently large to track short-time features with fine time resolution.

EEE 71. The method of EEE 67, wherein detecting the plurality of plosive events includes detecting outliers of the low-frequency energy distribution across all the short-time frames of a file according to a first threshold.

EEE 72. The method of any of EEEs 67-71, wherein detecting the plurality of plosive events further comprises:

calculating a threshold for LFE outlier detection based on the standard score; and applying a second threshold different from the first threshold (e.g., an adaptive threshold used to select dominant components).

EEE 73. The method of EEE 72, wherein the second threshold is adaptive to the difference between the maximal outlier and the first threshold.

EEE 74. The method of EEE 73, wherein consecutive frames that exceed the adaptive threshold define the time span of a plosive sound event.

EEE 75. The method of EEE 73, wherein a global attenuation effect amount [0,1] is mapped to the adaptive threshold scaled by a factor.

EEE 76. The method of EEE 67, wherein initial plosive event boundaries (e.g., start/stop positions) are defined by the method of EEE 73.

EEE 77. The method of any of EEEs 67-74, further comprising: refining plosive event positions (e.g., initial boundaries) based on zero-crossing maximum.

EEE 78. The method of EEE 77, further comprising: extending the start and end positions of plosive events until the zero-crossing maximum falls below a predefined threshold.

EEE 79. The method of EEE 67, wherein generating output audio includes crossfading at the plosive event boundaries of the plurality of plosive events with a predefined transition duration.

EEE 80. The method of EEE 67, wherein the filter order is adaptive to the strength of low frequency energy within a predefined order range.

EEE 81. The method of EEE 67, wherein the cutoff frequency is adaptive to the value zero-crossing maximum within a predefined cutoff frequency range.

EEE 82. The method of EEE 75, further comprising:

obtaining a probability of speech from a content classifier for one or more of the plurality of overlapping frames; and reducing the detection amount (e.g., by altering the global attenuation effect amount) when the respective probability is less than a first classification threshold.

EEE 83. The method of EEE 75, further comprising:

obtaining a probability of speech from a content classifier for one or more of the plurality of overlapping frames; and removing frames from the detected plosive events when the respective probability is less than a second classification threshold.

EEE 84. The method of EEE 67, wherein attenuating the plurality of plosive events using an adaptive high-pass filter includes:

filtering a first plosive event of the plurality of plosive events using a first filter order and a first cut-off frequency; and filtering a second plosive event of the plurality of plosive events using a second filter order and a second cut-off frequency, wherein at least one of the second filter order and the second cut-off frequency are different from the first filter order and the first cut-off frequency, respectively.

EEE 85. The method of EEE 67, wherein the adaptive high-pass filter is Butterworth filter.

EEE 86. A non-transitory computer-readable storage medium storing one or more programs including instructions which when executed by one or more processors, perform the method of any of EEEs 67-85.

EEE 87. An electronic device including one or more processors and a memory storing one or more programs including instructions which when executed by the one or more processors, cause the device to perform the method of any of EEEs 67-85.

EEE 88. A method of performing automatic audio enhancement on an input audio signal including at least one speech-articulation noise event, the method comprising:

segmenting the input audio signal into a number of audio frames;

obtaining at least one feature parameter from the audio frames; and determining, based at least in part on the obtained feature parameter, a respective type of the speech-articulation noise event and a respective time-frequency range associated with the speech-articulation noise event within the input audio signal.

EEE 89. The method according to EEE 88, wherein the determined range comprises at least one boundary of the determined speech-articulation noise event, in the time and/or spectral domain.

EEE 90. The method according to EEE 88 or 89, further comprising:

attenuating the speech-articulation noise event in accordance with the determined type and range thereof.

EEE 91. The method according to any one of the preceding EEEs, wherein the speech-articulation noise event comprises at least one of: a mouth click event or a speech plosive event.

EEE 92. The method according to EEE 91, wherein the speech-articulation noise event comprises one or more mouth click events; and wherein the one or more mouth click events comprise at least one of: a non-speech click event, a speech click event, or a lip smack event.

EEE 93. The method according to EEE 92, wherein, after segmenting the input audio signal into a number of audio frames, the method further comprises:

classifying the audio frames as either speech frames or non-speech frames.

EEE 94. The method according to EEE 93, wherein the input audio signal is identified and segmented into the speech frames and the non-speech frames by using a voice activity detector, VAD.

EEE 95. The method according to any one of EEEs 92 to 94, wherein the segmentation is performed by using two different window sizes, one of the two window sizes being shorter than the other.

EEE 96. The method according to EEE 95 when depending on EEE 93 or 94, wherein the shorter window size is used for detecting speech click events in the speech frames and the longer window size is used for detecting non-speech click events in the non-speech frames.

EEE 97. The method according to any one of EEEs 91 to 96, wherein obtaining at least one feature parameter from the audio frames comprises:

for each audio frame, obtaining at least one measure of kurtosis based on time-domain sample amplitudes of the audio frames, and wherein determining, based on the obtained feature parameter, a respective type of the speech-articulation noise event and a respective range thereof in the input audio signal comprises:

comparing the obtained measure of kurtosis to a predefined kurtosis threshold; and if the measure of kurtosis exceeds the predefined kurtosis threshold, determining that the audio frame comprises a mouth click event, and determining start and end boundaries of the mouth click event based on respective positions at which the measure of kurtosis rises above and falls below the predefined kurtosis threshold.

EEE 98. The method according to any one of EEEs 93 to 97, wherein obtaining at least one feature parameter from the audio frames comprises:

for each speech frame, obtaining a respective approximation of residual without speech harmonic components and a respective first measure of kurtosis of sample amplitudes for the approximation of residual, and wherein determining, based on the obtained feature parameter, a respective type of the speech-articulation noise event and a respective range thereof in the input audio signal comprises:

comparing the obtained first measure of kurtosis to a first predefined kurtosis threshold; and if the first measure of kurtosis exceeds the first predefined kurtosis threshold, determining that the speech frame comprises a speech click event, and determining start and end boundaries of the speech click event based on respective positions at which the first measure of kurtosis rises above and falls below the first predefined kurtosis threshold.

EEE 99. The method according to EEE 98, wherein the approximation of residual without speech harmonic components is a second-order waveform difference.

EEE 100. The method according to EEE 98 or 99, further comprising:

obtaining a second measure of kurtosis from residual sample amplitudes of the speech frame;

wherein the type and range of the speech-articulation noise event are determined based on the second measure of kurtosis relative to the first measure of kurtosis.

EEE 101. The method according to any one of EEEs 98 to 100, further comprising:

refining the determined range of the speech click event by:

locating a sample position with the largest second-order difference within the determined range of the speech click event; and determining the refined range of the speech click event by applying a predefined speech click event duration around the located sample position.

EEE 102. The method according to any one of EEEs 98 to 101, further comprising:

determining the range of the speech click event further based on a min/max change rate calculated from local minima and maxima in the speech frame.

EEE 103. The method according to any one of EEEs 93 to 102, wherein obtaining at least one feature parameter from the audio frames comprises:

for each non-speech frame, obtaining a respective third measure of kurtosis of time-domain sample amplitudes in the non-speech frame, and wherein determining, based on the obtained feature parameter, a respective type of the speech-articulation noise event and a respective range thereof in the input audio signal comprises:

comparing the obtained third measure of kurtosis to a second predefined kurtosis threshold; and if the third measure of kurtosis exceeds the second predefined kurtosis threshold, determining that the non-speech frame comprises a non-speech click event; and determining start and end boundaries of the non-speech click event based on respective positions at which the third measure of kurtosis rises above and falls below the second predefined kurtosis threshold.

EEE 104. The method according to EEE 103, further comprising:

if two neighboring non-speech click events are within a predefined gap threshold, merging the two neighboring non-speech click events into a single speech click event.

EEE 105. The method according to EEE 103 or 104, wherein for a determined non-speech click event in a non-speech frame immediately preceding a speech frame:

calculating a high/low-band peak ratio as an amplitude ratio between the largest peak above a predefined frequency and the largest peak below the predefined frequency; and if the calculated high/low-band peak ratio is above a predefined ratio threshold, determining the non-speech click event as a lip smack event.

EEE 106. The method according to EEE 105, wherein the high/low-band peak ratio is calculated as an amplitude ratio between the largest peak above a predefined frequency and the largest peak below the predefined frequency but above a further predefined low frequency.

EEE 107. The method according to EEE 105 or 106, further comprising:

refining the determined range of the lip smack event based on the high/low-band peak ratio, a spectral slope and an energy envelope.

EEE 108. The method according to EEE 107, wherein refining the determined range of the lip smack event comprises:

extending the end position of the lip smack event determined by using the third measure of kurtosis as long as: the high/low-band peak ratio is above the predefined ratio threshold, the spectral slope is below a predefined slope threshold and energy in the energy envelope decreases.

EEE 109. The method according to any one of EEEs 93 to 102, further comprising:

determining the speech-articulation noise event further based on the center of gravity, COG, calculated for the speech frames in accordance with a further predefined threshold, for distinguishing mouth click events from speech transients.

EEE 110. The method according to any one of EEEs 98 to 109, further comprising:

attenuating the determined one or more mouth click events based on respective spectral gains derived from spectral envelopes of the audio frames containing the detected mouth click events and target envelopes calculated based on respective reference frames.

EEE 111. The method according to EEE 110, wherein, for each detected mouth click event, the reference frames comprise an audio frame before the audio frame containing the detected mouth click event and an audio frame thereafter; and wherein the target envelope is calculated by interpolating spectral envelopes of the reference frames.

EEE 112. The method according to EEE 110 or 111, wherein the attenuation is applied for frequency bands higher than a predefined high frequency threshold.

EEE 113. The method according to any one of EEEs 98 to 109, further comprising:

replacing the determined one or more mouth click events based on respective neighboring audio frames.

EEE 114. The method according to EEE 91, wherein the speech-articulation noise event comprises at least one speech plosive event; and wherein obtaining at least one feature parameter from the audio frames comprises:

obtaining a respective measure of low frequency energy, LFE, for each of the audio frames, for identifying outliers thereof.

EEE 115. The method according to EEE 114, wherein the measure of LFE is calculated either in the time domain or in the spectral domain.

EEE 116. The method according to EEE 114 or 115, further comprising:

determining the range of the speech plosive event in accordance with the outliers identified from the measure of LFE and a threshold calculated based on the measure of LFE; or in accordance with an LFE ratio calculated from the previous and current audio frames.

EEE 117. The method according to EEE 116, further comprising:

obtaining a respective measure of zero crossing maximum, ZCM, for each of the audio frames, for refining the range of the speech plosive event that has been determined based on the measure of LFE, wherein the measure of ZCM indicates a length of the maximum interval of consecutive zero crossings within the audio frame.

EEE 118. The method according to EEE 116 or 117, further comprising:

attenuating the determined speech plosive event, wherein the attenuation is performed either in the time domain or in the spectral domain.

EEE 119. The method according to EEE 118, wherein the time domain attenuation is performed by applying a high-pass filter, wherein a cut-off frequency of the filter is determined based on the measures of ZCM for the audio frames within the range of the determined speech plosive event; and wherein an order of the filter is determined based on the measures of LFE for the audio frames within the range of the determined speech plosive event.

EEE 120. The method according to EEE 118, wherein the spectral domain attenuation is performed by using overlap-and-add short-time Fourier Transform, STFT, with adaptive spectral slope and frequency.

EEE 121. The method according to EEE 118 or 120, wherein the spectral domain attenuation involves processing the audio frames with fast Fourier Transform, FFT, applying an attenuation gain with adaptive slope and frequency, applying inverse FFT, windowing and overlap-adding in order to produce an attenuated output audio signal; wherein the frequency is determined based on the measures of ZCM for the audio frames within the range of the determined speech plosive event; and wherein the slope is determined based on the measures of LFE for the audio frames within the range of the determined speech plosive event.

EEE 122. The method according to EEE 121, further comprising:

applying a noise spectrum estimation for limiting the attenuation gain to prevent over-suppression.

EEE 123. The method according to any one of EEEs 114 to 122, further comprising:

applying a content classifier to the audio frames for distinguishing speech frames from non-speech frames in order to determine the speech plosive event.

EEE 124. The method according to EEE 118, wherein the spectral domain attenuation involves:

producing, by using an analysis filterbank, a number of approximately equivalent rectangular bandwidth, ERB, spaced frequency bands below and a number of bands above a predefined frequency threshold, the predefined frequency threshold being within the frequency range of the determined speech plosive event;

applying a number of attenuation gains respectively to audio signals in each of the frequency bands, wherein the attenuation gains are calculated based on energies calculated for the frequency bands; and feeding the attenuated audio samples to a synthesis filterbank for generating an output audio signal.

EEE 125. The method according to EEE 124, where the attenuation gain in each frequency band is further constrained to not reduce the energy of that frequency band below an estimated noise floor in that frequency band.

EEE 126. The method according to EEE 125, further comprising:

calculating a time smoothed low frequency energy estimate of audio samples above the estimated noise floor, for distinguishing speech plosive events from higher frequency contents in the input audio signal.

EEE 127. The method according to EEE 126, further comprising:

calculating a measure of speech harmonic protection in the spectrum of the input audio signal; and calculating the attenuation gains in accordance with the measure of speech harmonic protection and with the time smoothed low frequency energy estimate.

EEE 128. The method according to EEE 127, wherein the measure of speech harmonic protection is a measure of periodicity or tonality.

EEE 129. The method according to EEE 128, wherein the measure of periodicity in the spectrum is calculated from a cepstrum of the audio samples prior to the final band calculations of the analysis filterbank.

EEE 130. The method according to EEE 128, wherein the measure of tonality in the spectrum is calculated based on the main lobe of a spectral peak compared to that of a sinusoidal peak prior to the final band calculations of the analysis filterbank.

EEE 131. The method according to any one of EEEs 127 to 130, further comprising:

further constraining the calculated attenuation gain based on the frequency band immediately lower in frequency.

EEE 132. A method of performing automatic audio enhancement on an input audio signal for detecting and/or attenuating at least one speech-articulation noise event contained therein, the speech-articulation noise event comprising at least one speech plosive event, the method comprising:

producing, by using an analysis filterbank, a number of approximately equivalent rectangular bandwidth, ERB, spaced frequency bands below and a number of bands above a predefined frequency threshold, the predefined frequency threshold being within frequency range of the speech plosive event;

applying a number of attenuation gains respectively to audio signals in each of the frequency bands, wherein the attenuation gains are calculated based on energies calculated for the frequency bands; and feeding the attenuated audio samples to a synthesis filter bank for generating an output audio signal.

EEE 133. The method according to EEE 132, where the attenuation gain in each frequency band is further constrained to not reduce the energy of that frequency band below an estimated noise floor in that frequency band.

EEE 134. The method according to EEE 133, further comprising:

calculating a time smoothed low frequency energy estimate of audio samples above the estimated noise floor, for distinguishing speech plosive events from higher frequency contents in the input audio signal.

EEE 135. The method according to EEE 132 or EEE 134, further comprising:

calculating a measure of speech harmonic protection in the spectrum of the input audio signal; and calculating the attenuation gains in accordance with the measure of speech harmonic protection and with the time smoothed low frequency energy estimate.

EEE 136. The method according to EEE 135, wherein the measure of speech harmonic protection is a measure of periodicity or tonality.

EEE 137. The method according to EEE 136, where the measure of periodicity in the spectrum is calculated from a cepstrum of the audio input samples prior to the final band calculations of the analysis filterbank.

EEE 138. The method according to EEE 136, wherein the measure of tonality in the spectrum is calculated based on the main lobe of a spectral peak compared to that of a sinusoidal peak prior to the final band calculations of the analysis filterbank.

EEE 139. The method according to EEE 132 to 138, further comprising:

further constraining the calculated attenuation gain based on the frequency band immediately lower in frequency.

EEE 140. The method according to any one of EEEs 132 to 139, wherein the input audio signal is processed in continuous manner with a predefined look-ahead frame size.

EEE 141. An apparatus comprising a processor and a memory coupled to the processor, wherein the processor is adapted to cause the apparatus to carry out the method according to any one of the preceding EEEs.

EEE 142. A program comprising instructions that, when executed by a processor, cause the processor to carry out the method according to any one of EEEs 88 to 140.

EEE 143. A computer-readable storage medium storing the program according to EEE 142.

The invention claimed is:

1. A method of performing automatic audio enhancement on an input audio signal including at least one speech-articulation noise event, the method comprising:

segmenting the input audio signal into a number of audio frames;

obtaining at least one feature parameter from the audio frames, wherein obtaining the at least one feature parameter from the audio frames comprises, for each audio frame, obtaining at least one measure of kurtosis based on time-domain sample amplitudes of the audio frames;

determining, based at least in part on the obtained feature parameter, a respective type of the speech-articulation noise event and a respective time-frequency range associated with the speech-articulation noise event within the input audio signal, wherein determining, based on the obtained feature parameter, the respective type of the speech-articulation noise event and the respective range thereof in the input audio signal comprises:

comparing the obtained measure of kurtosis to a predefined kurtosis threshold; and if the measure of kurtosis exceeds the predefined kurtosis threshold, determining that the audio frame comprises a mouth click event, and determining start and end boundaries of the mouth click event based on respective positions at which the measure of kurtosis rises above and falls below the predefined kurtosis threshold; and attenuating the speech-articulation noise event in accordance with a determined type of the speech-articulation noise event and the respective time-frequency range associated with the speech-articulation noise event.

2. The method according to claim 1, wherein the determined range comprises at least one boundary of the determined speech-articulation noise event, in the time or spectral domain.

3. The method according to claim 1, wherein the speech-articulation noise event comprises at least one of: a mouth click event or a speech plosive event.

4. The method according to claim 3, wherein the speech-articulation noise event comprises one or more mouth click events; and wherein the one or more mouth click events comprise at least one of: a non-speech click event, a speech click event, or a lip smack event.

5. The method according to claim 4, wherein, after segmenting the input audio signal into a number of audio frames, the method further comprises:

classifying the audio frames as either speech frames or non-speech frames.

6. The method according to claim 5, wherein the segmentation is performed by using two different time window sizes, one of the two time window sizes being shorter than the other.

7. The method according to claim 6, wherein the shorter time window size is used for detecting speech click events in the speech frames and a longer time window size is used for detecting non-speech click events in the non-speech frames.

8. The method according to claim 5, wherein obtaining at least one feature parameter from the audio frames comprises:

for each speech frame, obtaining a respective approximation of residual without speech harmonic components and a respective first measure of kurtosis of sample amplitudes for the approximation of residual, and wherein determining, based on the obtained feature parameter, a respective type of the speech-articulation noise event and a respective range thereof in the input audio signal comprises:

comparing the obtained first measure of kurtosis to a first predefined kurtosis threshold; and if the first measure of kurtosis exceeds the first predefined kurtosis threshold, determining that the speech frame comprises a speech click event, and determining start and end boundaries of the speech click event based on respective positions at which the first measure of kurtosis rises above and falls below the first predefined kurtosis threshold.

9. The method according to claim 8, wherein the approximation of residual without speech harmonic components is a second-order waveform difference.

10. The method according to claim 8, further comprising:

obtaining a second measure of kurtosis from residual sample amplitudes of the speech frame;

wherein the type and range of the speech-articulation noise event are determined based on the second measure of kurtosis relative to the first measure of kurtosis.

11. The method according to claim 8, further comprising:

refining the determined range of the speech click event by:

locating a sample position with the largest second-order difference within the determined range of the speech click event; and determining the refined range of the speech click event by applying a predefined speech click event duration around the located sample position.

12. The method according to claim 8, further comprising:

determining the range of the speech click event further based on a min/max change rate calculated from local minima and maxima in the speech frame.

13. The method according to claim 8, further comprising:

attenuating the determined one or more mouth click events based on respective spectral gains derived from spectral envelopes of the audio frames containing detected mouth click events and target envelopes calculated based on respective reference frames.

14. The method according to claim 5, wherein obtaining at least one feature parameter from the audio frames comprises:

for each non-speech frame, obtaining a respective third measure of kurtosis of time-domain sample amplitudes in the non-speech frame, and wherein determining, based on the obtained feature parameter, a respective type of the speech-articulation noise event and a respective range thereof in the input audio signal comprises:

comparing the obtained third measure of kurtosis to a second predefined kurtosis threshold; and if the third measure of kurtosis exceeds the second predefined kurtosis threshold, determining that the non-speech frame comprises a non-speech click event; and determining start and end boundaries of the non-speech click event based on respective positions at which the third measure of kurtosis rises above and falls below the second predefined kurtosis threshold.

15. The method according to claim 14, further comprising:

if two neighboring non-speech click events are within a predefined gap threshold, merging the two neighboring non-speech click events into a single speech click event.

16. The method according to claim 14, wherein for a determined non-speech click event in a non-speech frame immediately preceding a speech frame:

calculating a high/low-band peak ratio as an amplitude ratio between the largest peak above a predefined frequency and the largest peak below the predefined frequency; and if the calculated high/low-band peak ratio is above a predefined ratio threshold, determining the non-speech click event as a lip smack event.

17. The method according to claim 16, further comprising:

refining the determined range of the lip smack event based on the high/low-band peak ratio, a spectral slope and an energy envelope.

18. The method according to claim 5, further comprising:

determining the speech-articulation noise event further based on the center of gravity, COG, calculated for the speech frames in accordance with a further predefined threshold, for distinguishing mouth click events from speech transients.

19. An apparatus comprising a processor and a memory coupled to the processor storing instructions, that when executed by the processor, cause the apparatus to carry out a method of performing automatic audio enhancement on an input audio signal including at least one speech-articulation noise event, the method comprising:

segmenting the input audio signal into a number of audio frames;

obtaining at least one feature parameter from the audio frames, wherein obtaining the at least one feature parameter from the audio frames comprises, for each audio frame, obtaining at least one measure of kurtosis based on time-domain sample amplitudes of the audio frames;

determining, based at least in part on the obtained feature parameter, a respective type of the speech-articulation noise event and a respective time-frequency range associated with the speech-articulation noise event within the input audio signal, wherein determining, based on the obtained feature parameter, the respective type of the speech-articulation noise event and the respective range thereof in the input audio signal comprises:

comparing the obtained measure of kurtosis to a predefined kurtosis threshold; and if the measure of kurtosis exceeds the predefined kurtosis threshold, determining that the audio frame comprises a mouth click event, and determining start and end boundaries of the mouth click event based on respective positions at which the measure of kurtosis rises above and falls below the predefined kurtosis threshold; and attenuating the speech-articulation noise event in accordance with a determined type of the speech-articulation noise event and the respective time-frequency range associated with the speech-articulation noise event.

20. A non-transitory computer-readable storage medium storing one or more programs comprising instructions that, when executed by a processor, cause the processor to carry out a method of performing automatic audio enhancement on an input audio signal including at least one speech-articulation noise event, the method comprising:

segmenting the input audio signal into a number of audio frames;

obtaining at least one feature parameter from the audio frames, wherein obtaining the at least one feature parameter from the audio frames comprises, for each audio frame, obtaining at least one measure of kurtosis based on time-domain sample amplitudes of the audio frames;

determining, based at least in part on the obtained feature parameter, a respective type of the speech-articulation noise event and a respective time-frequency range associated with the speech-articulation noise event within the input audio signal, wherein determining, based on the obtained feature parameter, the respective type of the speech-articulation noise event and the respective range thereof in the input audio signal comprises:

comparing the obtained measure of kurtosis to a predefined kurtosis threshold; and if the measure of kurtosis exceeds the predefined kurtosis threshold, determining that the audio frame comprises a mouth click event, and determining start and end boundaries of the mouth click event based on respective positions at which the measure of kurtosis rises above and falls below the predefined kurtosis threshold; and attenuating the speech-articulation noise event in accordance with a determined type of the speech-articulation noise event and the respective time-frequency range associated with the speech-articulation noise event.

* * * * *